United States Patent
Covelli et al.

(10) Patent No.: US 9,682,754 B2
(45) Date of Patent: *Jun. 20, 2017

(54) VISUAL DISTRESS SIGNAL DEVICE

(71) Applicant: Sirius Signal Co., San Diego, CA (US)

(72) Inventors: Anthony W. Covelli, La Costa, CA (US); Robert B. Simons, Jr., San Diego, CA (US)

(73) Assignee: Sirius Signal Co.

( * ) Notice: Subject to any disclaimer, the term of this patent is extended or adjusted under 35 U.S.C. 154(b) by 0 days.

This patent is subject to a terminal disclaimer.

(21) Appl. No.: 15/095,727

(22) Filed: Apr. 11, 2016

(65) Prior Publication Data

US 2016/0272287 A1    Sep. 22, 2016

Related U.S. Application Data

(63) Continuation-in-part of application No. 14/923,263, filed on Oct. 26, 2015, which is a continuation-in-part
(Continued)

(51) Int. Cl.
*B63B 45/04* (2006.01)
*G08B 5/36* (2006.01)
(Continued)

(52) U.S. Cl.
CPC ............... *B63B 45/04* (2013.01); *B63C 9/20* (2013.01); *G01S 19/17* (2013.01); *G08B 5/002* (2013.01); *G08B 5/36* (2013.01); *B63B 2201/08* (2013.01)

(58) Field of Classification Search
CPC ....... B63B 49/00; B63B 45/04; G01S 5/0231; F21Y 2111/001; G02B 19/0028; G02B 19/0061; F21V 5/04; H01L 33/58

USPC ... 340/815.45, 984, 539.13, 573.6, 471–473; 441/6, 11, 13, 17, 18; 362/227, 259, 237, 362/184, 327, 307, 800
See application file for complete search history.

(56) References Cited

U.S. PATENT DOCUMENTS 4,560,356 A * 12/1985 Burr .......................... B63C 9/08
                                                            222/5
5,280,270 A    1/1994 Correa et al.
(Continued)

FOREIGN PATENT DOCUMENTS

WO    2008048899    4/2008
WO    2013024359    2/2013

*Primary Examiner* — Mirza Alam
(74) *Attorney, Agent, or Firm* — The Belles Group, P.C.

(57) ABSTRACT

The present invention is directed to a visual distress signal device that includes a housing having an internal cavity with a first electrical contact and a power source positioned therein in an electrically coupled manner. An electronic assembly is at least partially positioned within the internal cavity of the housing. Such an electronic assembly may include a second electrical contact that is electrically coupled to the power source, a third electrical contact, and a light source. The device may also include a lens member detachably coupled to the housing to close an open top end of the housing in a watertight manner. A float member may be detachably coupled to the housing to provide buoyancy to the device. The electronic assembly may be movable within the internal cavity to electronically couple and decouple the third electrical contact and the first electrical contact to selectively power the light source.

16 Claims, 35 Drawing Sheets

Related U.S. Application Data of application No. 14/561,197, filed on Dec. 4, 2014, now Pat. No. 9,171,436, which is a continuation-in-part of application No. 29/493,224, filed on Jun. 6, 2014, now Pat. No. Des. 720,247.

(51) Int. Cl.
  *G08B 5/00*   (2006.01)
  *G01S 19/17*  (2010.01)
  *B63C 9/20*   (2006.01)

(56) References Cited

U.S. PATENT DOCUMENTS

| | | | |
|---|---|---|---|
| 5,594,433 A | 1/1997 | Terlep | |
| 6,549,121 B2 | 4/2003 | Povey et al. | |
| 7,320,631 B1* | 1/2008 | Distefano | B63B 22/16 362/477 |
| 8,072,345 B2 | 12/2011 | Gallo | |
| 8,917,187 B2 | 12/2014 | Matte | |
| 2003/0132852 A1 | 7/2003 | Povey et al. | |
| 2004/0012962 A1* | 1/2004 | Wolf | B63C 9/0005 362/259 |
| 2005/0225971 A1 | 10/2005 | Melnik | |
| 2006/0232962 A1 | 10/2006 | Altman | |
| 2007/0241887 A1* | 10/2007 | Bertagna | B63C 9/115 340/539.13 |
| 2008/0247161 A1* | 10/2008 | Hulsey | B63B 45/04 362/227 |
| 2010/0026571 A1* | 2/2010 | Batty | B63B 45/00 342/357.34 |
| 2011/0075409 A1* | 3/2011 | Zheng | F21V 29/76 362/231 |
| 2011/0122609 A1* | 5/2011 | Dahlin | F21L 4/027 362/184 |

\* cited by examiner

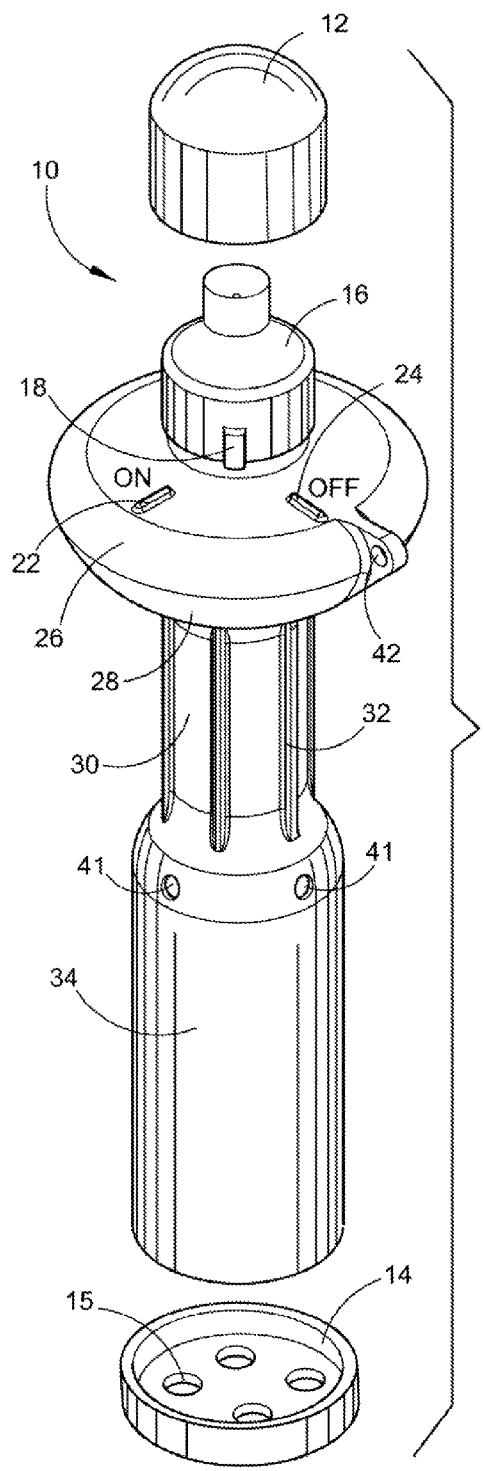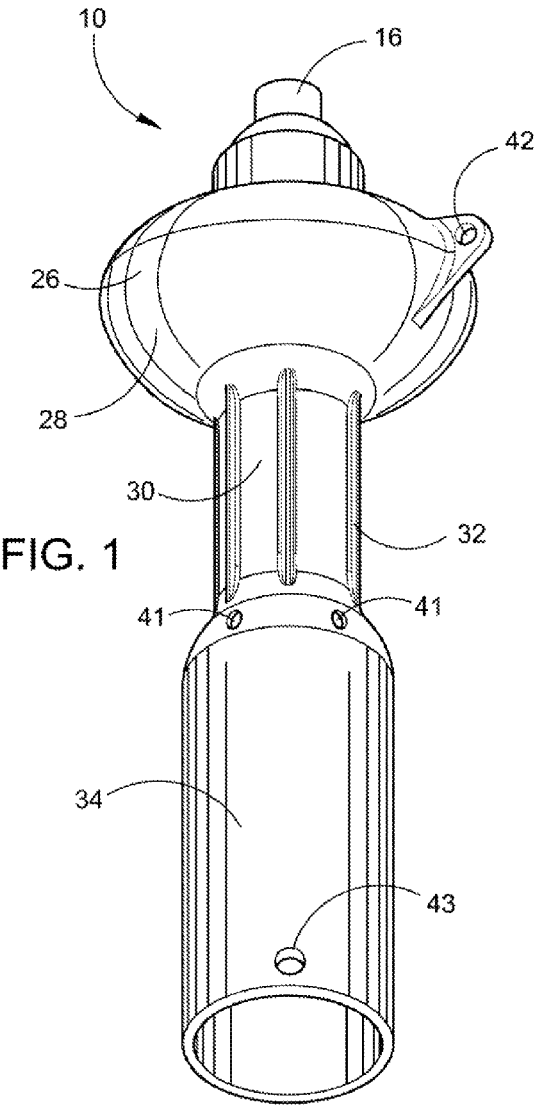
FIG. 1
FIG. 2

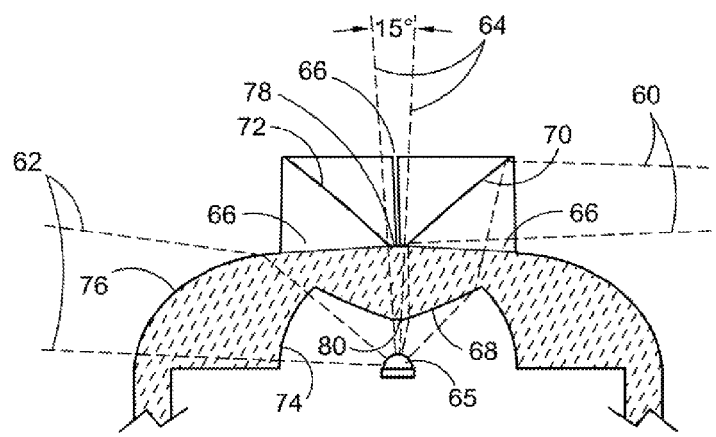
FIG. 6
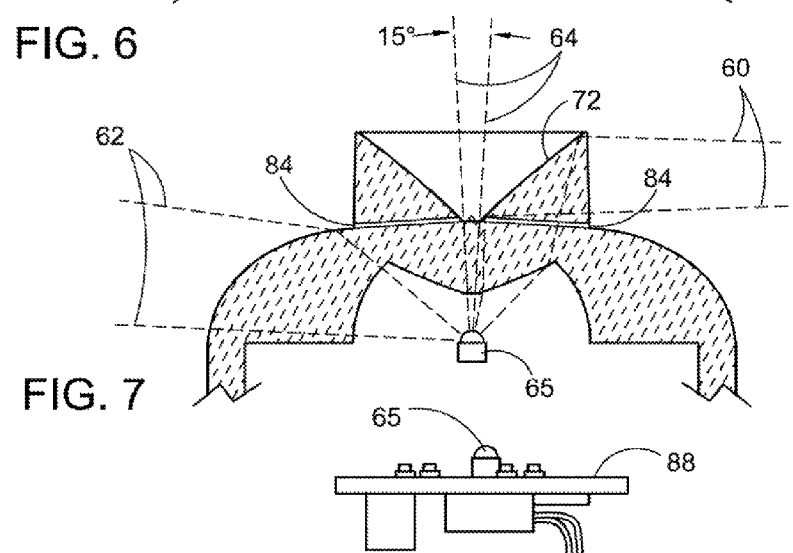
FIG. 7
FIG. 8
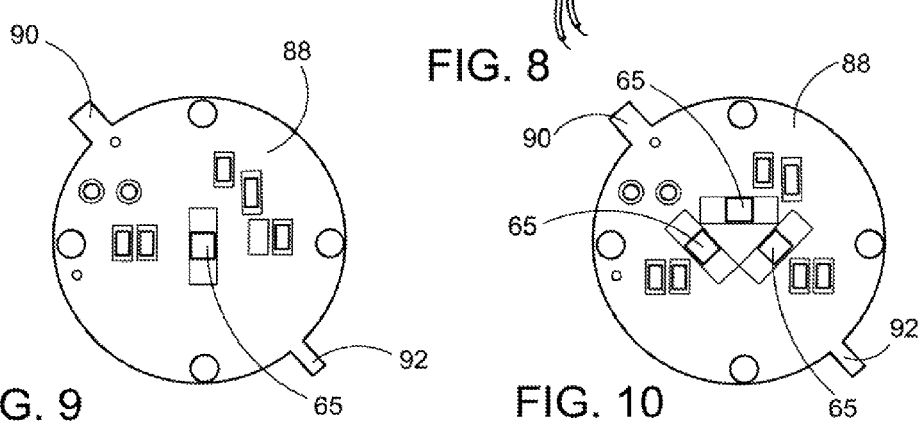
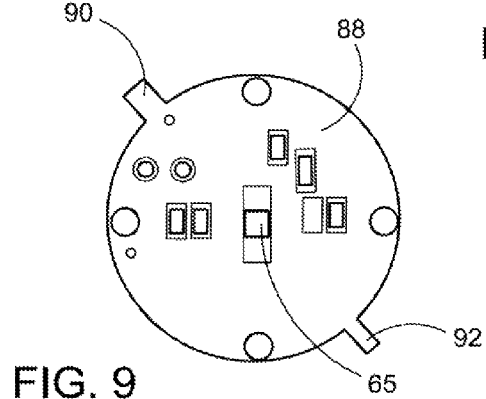
FIG. 9
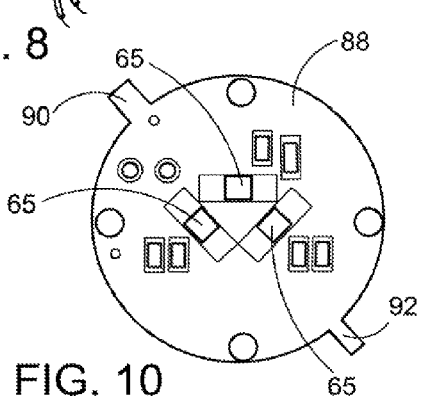
FIG. 10

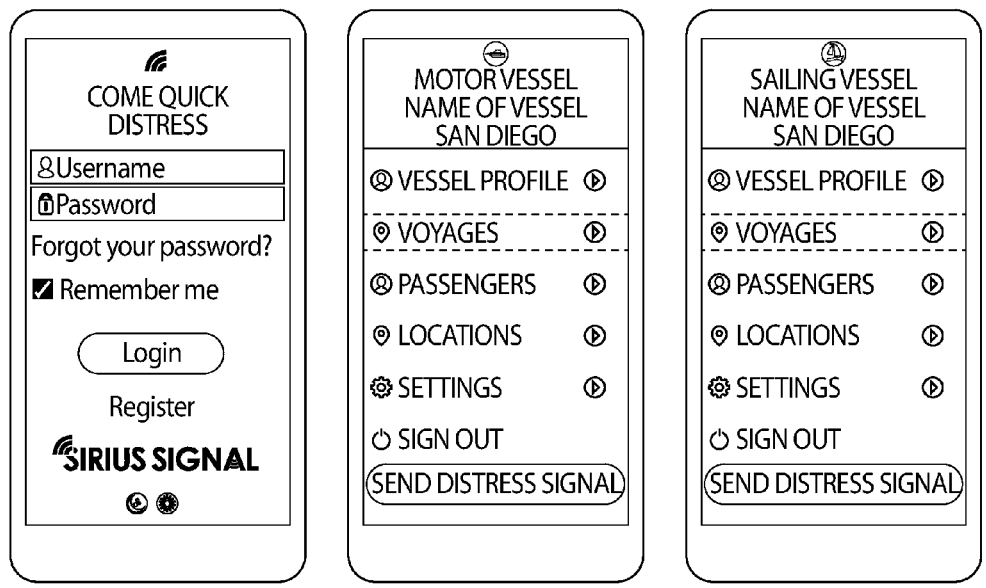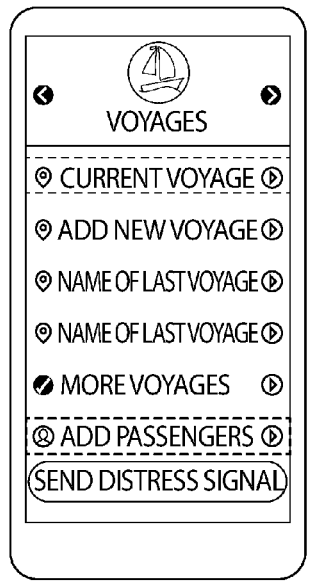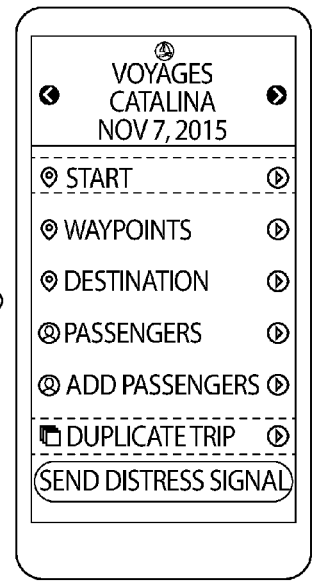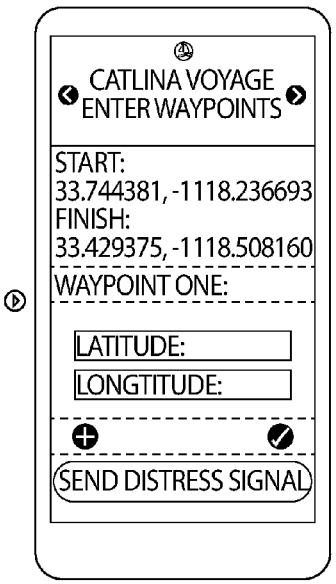
FIG. 35

COME QUICK DISTRESS

Username | Password | Login
Remember me | Forgot your password? | Register
Sign Out

DASHBOARD - 2015 Oct 16 (today's date)

- VESSEL PROFILE
  - VOYAGES
  - PASSENGERS
  - LOCATIONS
  - WEATHER
  - DISTRESS NOTIFICATIONS
  - CLOSEST MEDICAL FACILITIES
  - CONTACT GOVERNMENT AGENCIES
  - VESSEL ASSIST SERVICES
  - SETTINGS

CURRENT VOYAGE: Name of Destination — Edit
- CURRENT LOCATION: GPS Coordinates
- DEPARTINGS: San Diego
- DESTINATION: Half Moon Bay YC
- WAYPOINTS: Sailing Yacht
- PASSENGERS: Smith, Joe / Doe, John / Kline, Susan / Warren, Brent
- FORECAST: Sunny skies

[AT HAILING PORT] [UNDERWAY] [ARRIVED]

Closest Medical Facilities — Edit
- Catalina: Two Harbors — 3 nmi
- Catalina: Avalon — 4 nmi
- Long Beach — 30 nmi
- Dana Point — 35 nmi
- Newport Beach — 40 nmi
- Oceanside — 50 nmi

[Set Waypoints]

VESSEL PROFILE: Name of Vessel — Edit
- CAPTAIN: Anthony Covelli
- HAILING PORT: San Diego
- TYPE OF VESSEL: Sailing Yacht
- LENGTH: 36'
- MAKE: Swan
- YEAR: 1990
- TYPE: Sloop

Distress Signals — Edit
- SEND DISTRESS SIGNAL ON ALL AVAILABLE CHANNELS
- SEND DISTRESS SIGNAL TO NEARBY VESSELS
- SEND VESSEL DATA TO SOS DISTRESS LIGHT
- ACTIVATE DISTRESS LIGHT

[More options]

Weather — Edit
AwesomeCity
16°C
Real Feel: 18
Wind: N-E, 5-8 km/h
Sunset: 9:18PM
Sunrise: 6:02AM
Pressure: 1000 MB
Humidity: 51%

| SUN | THU | WED | TUE | FRI | SAT | MON |
|---|---|---|---|---|---|---|
| 10° | 15° | 18° | 11° | 12° | 10° | 10° |

Current Passengers | All Passengers
- ADAMS, JANE — F 28
- BARKER, PHILLIP — M 55
- CARSON, ERIC — M 18
- DOE, JOHN — M 45
- ENBERG, GREG — M 22
- FIRTH, JOHN — M 55
- GAVIOTA, RENE — F 32
- HOLMSTROM, AMY — F 50
- JONES, KATHY — F 33
- KITZMILLER, SEAN — M 56
- LONG, LORI — F 23
- MILLS, JOE — M 33

Locations List View | Locations Map View — Edit

FIG. 37

COME QUICK DISTRESS

DASHBOARD - 2015 Oct 16 (today's date)

- ⊗ VESSEL PROFILE ⊗
- ⊙ VOYAGES ⊗
- ⊗ PASSENGERS ⊗
- ⊙ LOCATIONS ⊗
- ⚙ WEATHER ⊗
- ⊙ DISTRESS NOTIFICATIONS ⊗
- ⊙ CLOSEST MEDICAL FACILITIES ⊗
- ⚙ CONTACT GOVERNMENT AGENCIES
- ⚙ VESSEL ASSIST SERVICES ⊗
- ⚙ SETTINGS ⊗

Vessel Profile: Name of Vessel     Edit

CAPTAIN: Anthony Covelli
HAILING PORT: San Diego
TYPE OF VESSEL: Sailing Yacht
LENGTH: 36'
MAKE: Swan
YEAR: 1990
TYPE: Sloop Username | Password | Login
Remember me | Forgot your password? | Register
Sign Out

FIG. 39

COME QUICK DISTRESS

DASHBOARD - 2015 Oct 16 (today's date)

| | Username | Login |
|---|---|---|
| | ☑ Remember me | Register |
| | Password | |
| | Forgot your password? | ⟳ Sign Out |

⚠ Current Distress Notifications                                        ✎ Edit

| | | | | |
|---|---|---|---|---|
| NOTIFY COAST GUARD: | Active | Inactive | Continuous | Intermittent |
| NOTIFY LOCAL LAW ENFORCEMENT: | Active | Inactive | Continuous | Intermittent |
| CUSTOMS: | Active | Inactive | Continuous | Intermittent |
| BORDER PATROL: | Active | Inactive | Continuous | Intermittent |
| NOTIFY VESSELS WITH THIS APP: | Active | Inactive | Continuous | Intermittent |
| REQUEST A VEHICLE SAFETY CHECK: | Active | Inactive | Continuous | Intermittent |
| ACTIVATE DISTRESS SIGNAL: | | | | |
| SEND DATA TO SOS DISTRESS SIGNAL: | Last sent | 2016-10-16 | 22:10:08 | Send |

- ⊛ VESSEL PROFILE
- ⊛ VOYAGES
- ⊛ PASSENGERS
- ⊛ LOCATIONS
- ⊛ WEATHER
- ⊛ DISTRESS NOTIFICATIONS
- ⊛ CLOSEST MEDICAL FACILITIES
- ⊛ CONTACT GOVERNMENT AGENCIES
- ⊛ VESSEL ASSIST SERVICES
- ⊛ SETTINGS

VESSEL PROFILE: Name of Vessel    ✎ Edit

CAPTAIN: Anthony Covelli
HAILING PORT: San Diego
TYPE OF VESSEL: Sailing Yacht
LENGTH: 36'
MAKE: Swan
YEAR: 1990
TYPE: Sloop

FIG. 40

VISUAL DISTRESS SIGNAL DEVICE

CROSS-REFERENCE TO RELATED APPLICATIONS

This application is a continuation-in-part of U.S. patent application Ser. No. 14/923,263, filed on Oct. 26, 2015, which is a continuation-in-part of U.S. patent application Ser. No. 14/561,197, filed on Dec. 4, 2014 (now U.S. Pat. No. 9,171,436), which is a continuation-in-part of U.S. patent application Ser. No. 29/493,224, filed on Jun. 6, 2014 (now U.S. Pat. No. D720,247), the entireties of which are incorporated herein by reference.

FIELD OF THE INVENTION

This application relates to devices used in search and rescue of vessels and persons in distress, especially but not limited to in a marine environment. More particularly, the present application provides an emergency beacon having a high-intensity pattern of light. This device can be used as a replacement for pyrotechnic flares utilized in search and rescue of vessels and persons in distress, especially in a marine environment.

BACKGROUND OF THE INVENTION

A vast assortment of signaling lights, including search and rescue devices for the use on vessels in distress, have been used for many years. The use of pyrotechnic flares as a distress signal device has been most common in the past. Pyrotechnic flares are exceptionally dangerous because they can easily burn the people using them, they can start the vessels on fire if there is a fuel leak and they can even burn under water creating additional problems. Moreover, one cannot overemphasize the potential environmental disaster of flare disposal. Over the next three years it is estimated that approximately 30 million flares will be disposed of improperly or illegally. Furthermore, pyrotechnic flares only emit light for a minute or so, thereby making it difficult to properly time the activation period to ensure that the light is seen by a search team. Finally, pyrotechnic flares expire over time and thus require frequent replacement to ensure that boat owners are in full compliance with regulations.

The Coast Guard's Research, Development, Test and Evaluation (RDT&E) program is working on more than 80 projects that support Coast Guard requirements across all mission areas. The RDT&E program is comprised of the Office of RDT&E at Coast Guard Headquarters in Washington, D.C., and the Research and Development Center (RDC) at New London, Conn. The RDC is the Coast Guard's sole facility performing applied RDT&E experimentation and demonstrations.

The RDT&E program pursues technologies that provide incremental improvements as well as those with the greatest potential to strategically transform the way the Coast Guard does business.

The RDT&E program leverages partnerships with academia, other government agencies and private industry, to proactively anticipate and research solutions to future technological challenges.

Search and Rescue Distress Notification Methods and Alternatives by the United States Coast Guard reviewed pyrotechnic flares that are commonly used by mariners to signal distress. Flares have drawbacks and present significant storage and disposal problems. The RDC was sought to determine appropriate criteria to evaluate light emitting diode (LED) or other light signals as potential maritime distress signals.

The project team selected a group of LED, flashtube (strobe) and incandescent-based devices to obtain photometric data. An understanding of the physical and perceptual aspects of these devices allowed the project team to select a subset of devices for further evaluation.

Following the lab tests, the project team designed and conducted two field demonstrations. The first demonstration assessed individual devices to determine the most effective signal characteristics based on detectable range, ability to attract attention and ability to distinguish the signal against background lighting. A second demonstration used a subset of the devices to compare the most effective characteristics, head-to-head. Finally, a separate evaluation looked at device ergonomics to help understand the physical aspects of the devices that would make them easier to use.

This project was to determine suitability of potential alternatives to pyrotechnic visual distress signals by: (1) evaluating the effectiveness of presently available LED (and other) devices as Visual Distress Signal Devices; (2) reviewing functional requirements for visual distress signals; (3) investigating and reporting on device characteristics and evaluating them against existing pyrotechnic standards; (4) investigating and reporting on "experimental" or "developmental" technologies and evaluating them against pyrotechnic standards; and (5) determining the most effective light-signal characteristics for alternative Visual Distress Signal Devices.

Additionally, this project will produce recommendations for future non-pyrotechnic requirements and applications. Recommendations will address the feasibility of whether non-pyrotechnic devices could replace pyrotechnics as alert, locate and/or marker devices. Alert and locate specifications for the signal lights differ in the varying peak intensity and the focal height of the LED emitted light, which can be altered by manually adjusting the distance between the LED and the optics.

Numerous innovations for the Visual Distress Signal Device have been provided in the prior art that are described as follows. Even though these innovations may be suitable for the specific individual purposes to which they address, they differ from the present design as hereinafter contrasted.

The following is a summary of those prior art patents most relevant to this application at hand, as well as a description outlining the difference between the features of the Visual Distress Signal Device and the prior art.

U.S. Pat. No. 7,153,002 of Jin Jong Kim describes a lens for light emitting diode (LED) light sources which allows light emitted from an LED light source to exit the lens in a direction perpendicular to a vertical center axis of the lens. The lens of the present invention includes an inner space which is defined in a lens body having both a bottom surface and an upper reflective surface, so that light passing through the inner space is partially reflected by total internal reflection on a portion (selective transmission surface, inner reflective surface, inside reflective surface) of a boundary surface between the inner space and the lens body. Thus, light emitted from an LED light source efficiently exits the lens through a side surface. Accordingly, the lens of the present invention is used in efficient display and illumination of optical systems.

This patent describes a light emitting diode (LED) light source which allows light emitted from an LED light source to exit the lens in a direction perpendicular to a vertical center axis of the lens used in display and illumination optical systems. This lens does not have the same internal structure and it only describes an LED light source exiting the lens in a direction perpendicular to a vertical center axis of the lens. It does not address the value of a portion of the light to be directed vertically or describe the other unique features of the Visual Distress Signal Device.

U.S. Pat. No. 6,679,621 of Robert S. West et al. describes a lens that comprises a bottom surface, a reflecting surface, a first refracting surface obliquely angled with respect to a central axis of the lens, and a second refracting surface extending as a smooth curve from the bottom surface to the first refracting surface. Light entering the lens through the bottom surface and directly incident on the reflecting surface is reflected from the reflecting surface to the first refracting surface and refracted by the first refracting surface to exit the lens in a direction substantially perpendicular to the central axis of the lens. Light entering the lens through the bottom surface and directly incident on the second refracting surface is refracted by the second refracting surface to exit the lens in a direction substantially perpendicular to the central axis of the lens. The lens may be advantageously employed with LEDs, for example, to provide side-emitting light-emitting devices. A lens cap attachable to a lens is also provided.

This patent describes a side-emitting light-emitting lens that does not have the same internal structure and again does not address the value of a portion of the light to be directed vertically or describe the other unique features of the Visual Distress Signal Device.

U.S. Pat. No. 6,607,286 of Robert S. West et al. describes a lens mounted to a light emitting diode package internally redirects light within the lens so that a majority of light is emitted from the lens approximately perpendicular to a package axis of the light emitting diode package. In one embodiment, the light emitted by the light emitting diode package is refracted by a saw tooth portion of the lens and reflected by a total internal reflection portion of the lens.

This patent describes another side-emitting light-emitting lens that does not have the same internal structure and again does not address the value of a portion of the light to be directed vertically or describe the other unique features of the Visual Distress Signal Device.

U.S. Pat. No. 6,598,998 of Robert S. West et al. describes a lens mounted to a light emitting diode package internally redirects light within the lens so that a majority of light is emitted from the lens approximately perpendicular to a package axis of the light emitting diode package. In one embodiment, the light emitted by the light emitting diode package is refracted by a saw tooth portion of the lens and reflected by a total internal reflection portion of the lens.

This patent describes another side-emitting light-emitting lens that does not have the same internal structure and again does not address the value of a portion of the light to be directed vertically or describe the other unique features of the Visual Distress Signal Device.

U.S. Pat. No. 2,492,837 of Eugene Briggs describes an electronically operated signal lights and more particularly to a portable light of the flashing type adapted for emergency or signal use.

This patent describes a self-contained portable flashing light of the gaseous discharge type energized by a battery that has not been designed to be used in a marine environment and does not float in the water.

U.S. Pat. No. 5,034,847 of John E. Brain describes a portable light beacon for use on life rafts and the like that has a long life due to a flashing light allowing the battery to recharge and a water sensing switch that once wet remains on. The light beacon comprises a portable battery power source in a water proof container, a flashing light with watertight electrical connections between the flashing light and the power source, and a fluid sensing switch comprising a fluid absorbent composition positioned between two terminals with circuitry to activate the flashing light when an electrical conductive fluid has been absorbed by the fluid absorbent composition to provide an electrical path between the two terminals.

This patent describes a hand held light beacon for use on life rafts and the like that has a long life due to a flashing light but does not have the lens capability of horizontal or vertical light directing and has not been designed to float vertically or be tied by a lanyard lifted to the top of a mast.

U.S. Pat. No. 7,182,479 of John f. Flood et al. describes a portable, hand-held, electrically powered, high intensity directed light beam generating device for use as a replacement for a pyrotechnic flare for search and rescue, especially in a marine environment. The light intensity is generated by a xenon strobe flash tube in a covered, mirror reflective housing that allows for a directional beam of light of less than 6 steradians. The limited radiation light direction provides a safe optical solution for the user to prevent eye damage while increasing the beam intensity and range. The light and illumination section surrounding the strobe flash tube includes thermally conductive paths for the heat generated by the flash tube to be transmitted to the outside of the housing.

This patent describes a hand held electrically powered, high intensity directed light beam generating device but does not have the unique lens capability nor does it float in the water and if you let go of it would sink.

U.S. Pat. No. 7,703,950 of Jurgen E. Ewert et al. describes a side-emitting lens for use with an LED lamp provides a distribution of emitted light that is substantially normal to an axis of symmetry of the lens; the light can also be symmetrical with respect to a plane normal to the lens axis. The lens has a cavity in which the LED lamp can reside, having a cavity refracting surface with a central section and a stepped cavity sidewall. The lens also has a base external refracting surface surrounding the cavity, an internal reflecting surface spaced apart from the cavity, and a side surface; these surfaces redirect light that enters the lens through the cavity refracting surface. For many applications, the lens axis is vertical in service and the lens is configured to provide a narrow distribution of light in the horizontal plane.

This patent describes only a side-emitting lens for an LED lamp having a base section with a cavity defined by a cavity refracting surface with a substantially planar central section, which is substantially normal to the central lens axis, and a stepped cavity sidewall having a series of sidewall refracting surfaces, and a base external refracting surface symmetrically disposed about the central lens axis and spaced apart from said stepped cavity sidewall. The Visual Distress Signal Device lens does not have the stepped cavity sidewall but has a concave inner surface while having drain capability of the conical upper cavity. The application additionally provides the complete structure of the Visual Distress Signal Device and its unique floating capabilities.

U.S. Pat. No. 8,702,256 of Hans Poul Alkaer relates to an emergency light device for marine use comprising a housing accommodating an electronic circuit, at least one transparent dome, and a first and a second housing member, said electronic circuit comprising at least one light emitting diode provided in the one transparent dome, an electrical power supply comprising at least one battery of the AA, AAA or AAAA type, and at least one operating switch, said emergency light characterized in that the housing has a width which is substantially larger than the height, preferably the width is at least double or triple the height.

This patent describes a light for a life jacket that would sink if it were dropped in the water and does not provides the complete structure of the Visual Distress Signal Device and its unique floating capabilities.

U.S. Pat. No. 6,805,467 of Edward A. Wolf describes a portable emergency light for long range detection by flight and marine search and rescue personnel which utilizes a battery-powered laser array mounted and sealed within a waterproof housing to increase the effective intensity of a specific class laser. The laser array includes a plurality of laser light generators mounted together to project substantially along a common optical axis producing a signaling light. The search and rescue light may include a rotatable head for directing the signaling lights along a 360 degree plane and a three-dimensional gimbal which maintains the light beams in a level horizontal position so that the signaling lights may be easily projected along the entire horizon relative to the user. Each laser light generator is within US Government safety standards for the specific class laser despite the increased power of the signal. The laser array can be used with optical alignment lenses to form a desired highly visible light pattern.

This patent describes an emergency laser array signal light that utilizes a battery-powered laser array mounted and sealed within a waterproof housing to increase the effective intensity of a specific class laser but does not have any floating capability.

In this respect, before explaining at least one embodiment of the Visual Distress Signal Device in detail it is to be understood that the design is not limited in its application to the details of construction and to the arrangement, of the components set forth in the following description or illustrated in the drawings. The Visual Distress Signal Device is capable of other embodiments and of being practiced and carried out in various ways. In addition, it is to be understood that the phraseology and terminology employed herein are for the purpose of description and should not be regarded as limiting.

SUMMARY OF THE INVENTION

The principle advantage of the device described in the present application is that it can be used to locate marine vessels and/or persons in distress, with a high-intensity portable LED signaling light that is compliant within current and future published governmental regulations for devices utilized in search and rescue operations.

Another advantage of this device is that it provides an LED signaling device that eliminates the use of pyrotechnic flares especially in marine environment.

Another advantage of this device is that the primary light source is not only directed in a horizontal plane, for radial symmetry, but a portion is directed vertically through a transitional angle of divergence between horizontal and vertical planes.

Another advantage of this device is that it has one or more intermittent LED lights that can be provided in varying colors and can replicate one or more preprogrammed approved distress signal flash sequences such as an SOS signal or other defined flash patterns.

Another advantage of the device is changes to the vertical positions of the LED changes the aiming direction of the beam from both the first and second parts of the lens. This allows the peak intensity of the lens to be varied as needed for specific applications. Raising the position of the LED within the lens will lower the beam angle from the first section of the lens and raise the beam angle from the second total internal reflection (TIR) section of the lens. So this allows the total beam angle to be widened or split into 2 beams if desired. This is particularly helpful in switching from the alert to the locate signal status during a search and rescue operation.

Another advantage of this device is to provide a LED signaling device that eliminates the problems of storage and disposal of old or damaged pyrotechnic flares.

Another advantage of the device is to provide a very high-intensity portable light signaling device that is safe for the user in any environment.

Another advantage of the device is that it will float in an upright position.

Another advantage of the device is that in a lower compartment it can house a die marker, a Coast Guard approved distress flag or a non-pyrotechnic smoke generating device.

Another advantage of this device is that the conical central element of the lens may have a means to drain water that collects in the center.

Yet another advantage of the device is that it is portable, floatable and can be hoisted aloft for optimal visual range and effectiveness and also be tethered to the vessel, a life raft or person in the water. Additionally, with the flag or dye marker removed from the chamber housing, a pole or boat hook can be inserted into the empty chamber to elevate the device. In this regard, the lower chamber is sized for display in a standard cup holders or fishing rod holders commonly found on most boats.

The device provides a high-intensity, radially symmetrical, omni directional beam electrically-powered, LED light generating signal locating device for use as a replacement of pyrotechnic flares.

The device has a lens with a conical upper reflective cavity that may include the capability to drain any moisture out to the side by the means of one or more vertical slits or one or more slanting drain holes at the bottom of the conical cavity. The device may also incorporate a snap on lower section to house either a die marker, or an internationally recognized distress signaling flag used to aid search and rescue personnel or a non-pyrotechnic smoke generating device. The LED's timing and control of the pulsating flashes is electronically controlled by electrical circuitry that will use a programmable microcontroller.

The marine application includes a waterproof housing with sealing O-rings and may include an exterior magnet on the optical lens cap which will be rotated for activation of the LED light reed switch without compromising the housing structure.

The light intensity distribution generated by the device may be greater than 75 candelas in the horizontal plane and greater than 15 candelas along the vertical axis. The light is generated by one or more pulsating light emitting diodes (LEDs) and is distributed by two or more distinct sections of an optical lens. In one embodiment, tight entering the first section of the lens is refracted through the outer lens surface into the horizontal plane, light entering the second section of the lens is refracted toward a total internal reflection (TIR) feature, which then reflects light toward the horizontal plane, and light entering the third section of the lens, directly above the LED, is allowed to pass through the inner and outer surfaces relatively unaffected, thus maintaining its original direction toward the vertical axis. The unit is powered by one or more batteries, preferably lithium or alkaline batteries.

A feature of the device is that changes to the vertical position of the LED changes the aiming direction of the beam from both the first and second parts of the lens. This allows the peak intensity of the lens to be varied as needed for specific applications. Raising the position of the LED within the lens will lower the beam angle from the first section of the lens and raise the beam angle from the second total internal reflection (TIR) section of the lens. This allows the total beam angle to be widened or split into 2 beams if desired.

The operational instructions for the device may include:
Snap the lower compartment to the upper housing.
Insert batteries in battery holder board assembly.
Place supplied EDPM O-ring seals in grooves below thread group on upper housing.
Insert complete battery holder board assembly in opening of upper assembly. Lower into place, rotate to align board for proper switch operation position.
Thread optical lens cap on upper housing clockwise until it bottoms out. Magnet will line up with the word "ON" and the device will be operating. Rotate lens cap counterclockwise to the word "OFF" Your device is now at the ready. A third setting for "TEST" is also anticipated, as well as a battery strength signal switch, for when the light is tested and the batteries checked with turning on the light.

In one particular embodiment, when the magnetically activated reed switch is first turned on to power the circuit pass element, in this example the MOSFET Q1 is turned on. The current through the LED and inductor ramps up until the current through the current sensor element matches the reference. Then pass element, in this example a MOSFET Q1 is turned off and an inductor L1 continues to supply the current through zener D3 until its stored energy is exhausted. After some delay, the MOSFET Q1 is turned on again and the cycle repeats. This cycle repeats during the time the light source is intended to be on and effectively generates the maximum light with the most efficient use of the battery power. Various patterns can be constructed by turning this cycle on and off. For example an S-O-S pattern for a marine beacon. Other color combinations are anticipated, such as cyan-cyan-cyan, red/orange-red/orange-red/orange and numerous other combinations of these colors, chosen from all wavelengths of the visible light spectrum, with white LED emitted light mixed in.

In one embodiment, the invention may be a visual distress signal device comprising: a housing having a closed bottom end, an open top end, and an internal cavity, a first electrical contact positioned within the internal cavity; a power source positioned within the internal cavity of the housing, the power source electrically coupled to the first electrical contact; an electronic assembly at least partially positioned within the internal cavity of the housing, the electronic assembly comprising a second electrical contact that is electrically coupled to the power source, a third electrical contact that is spatially isolated from the second electrical contact, and a light source; a lens member detachably coupled to the housing to close the open top end of the housing in a watertight manner to prevent liquids from passing into the internal cavity of the housing; and a float member detachably coupled to the housing, wherein the visual distress signal device floats when placed in water with the float member attached to the housing.

In another embodiment, the invention may be a visual distress signal device comprising: a housing defining an internal cavity; an electronic assembly at least partially positioned within the internal cavity of the housing, the electronic assembly comprising an illumination device; a power source positioned within the internal cavity of the housing and configured to power the illumination device; and a lens member detachably coupled to the housing between: (1) a first attached state in which the lens member is coupled to the housing in a watertight manner and the illumination device does not emit light; (2) a second attached state in which the lens member is coupled to the housing in a watertight manner and the illumination device emits light; and (3) a detached state in which the lens member is completely detached and separated from the housing In yet another embodiment, the invention may be a visual distress signal device comprising: a housing having an upper compartment and a lower compartment; a light source located within said upper compartment; an optical lens located above said light source, said optical lens having a conical upper reflective cavity, wherein said optical lens is configured to refract at least two separate beam light patterns including a horizontal 360 degree light pattern and a vertical light pattern; a power source located below said light source within said lower compartment; and wherein the visual distress signal device floats in water in an upright position with said upper compartment above said lower compartment and wherein when activated said light source is configured to emit light in a flashing SOS visual distress pattern The foregoing has outlined rather broadly the more pertinent and important features of the present device in order that the detailed description of the application that follows may be better understood so that the present contribution to the art may be more fully appreciated. Additional features of the design will be described hereinafter which form the subject of the claims of this disclosure. It should be appreciated by those skilled in the art that the conception and the disclosed specific embodiment may be readily utilized as a basis for modifying or designing other structures and methods for carrying out the same purposes of the present design. It should also be realized by those skilled in the art that such equivalent constructions and methods do not depart from the spirit and scope of this application as set forth in the appended claims.

BRIEF DESCRIPTION OF THE DRAWINGS

The accompanying drawings, which are incorporated in and form a part of this specification, illustrate embodiments of the Visual Distress Signal Device and together with the detailed description, serve to explain the principles of this application.

FIG. 1 depicts a perspective of the Visual Distress Signal Device with the protective lens cap and bottom drain cap.

FIG. 2 depicts a perspective of the Visual Distress Signal Device.

FIG. 6 depicts a cross section through the upper portion of the lens defining the transparent and reflective surfaces and the drain slots.

FIG. 7 depicts a cross section through the upper portion of the lens defining the transparent and reflective surfaces and the drain holes.

FIG. 8 depicts a side view of the circuit board with a single LED.

FIG. 9 depicts a top view of the circuit board with a single LED.

FIG. 10 depicts a top view of the circuit board with one or more (in this case) three LED's, where the placement of the multiple LED's is crucial for optimal operation of the Visual Distress Signal Light.

FIG. 35 depicts several screen shots of a mobile application for communication between the beacon and smartphones having a home level and two first levels, a second level and a third level.

FIG. 37 depicts a screen shot of the web-based application accessed via the beacon mobile application, illustrating the home level for the dashboard page.

FIG. 39 depicts a screen shot of the web-based application accessed via the beacon mobile application, illustrating the vessel profile page.

FIG. 40 depicts a screen shot of the web-based application accessed via the beacon mobile application, illustrating the current distress notifications page.

DETAILED DESCRIPTION OF THE INVENTION

Figure 3:
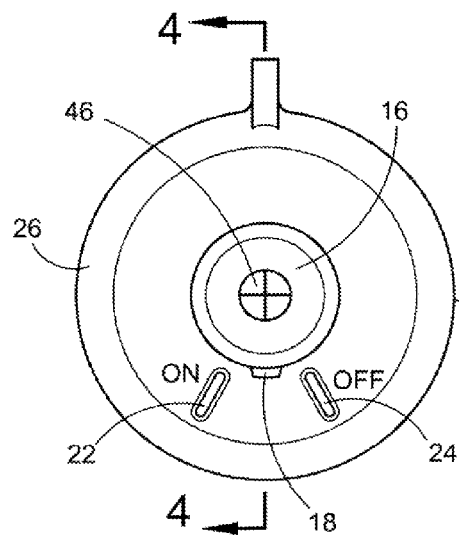
FIG. 3 depicts a top view of the Visual Distress Signal Device.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring now to the drawings, wherein similar parts of the Visual Distress Signal Device 10A and 10B are identified by like reference numerals, there is seen in FIG. 1 a perspective of the Visual Distress Signal Device 10A with the protective lens cover 12 and a bottom cap 14 with drain orifices 15. This view illustrates the transparent lens 16 with the magnet protrusion 18 and the on and off positioning indicators 22 and 24 on the bulbous top portion 26 of the water tight light housing 28 above the cylindrical grip portion 30 with nonslip ribs 32. The removable snap-on lower compartment 34 has orifices 41 on the top surface to allow air to escape or water to get in to maintain the vertical positioning of the device. The Visual Distress Signal Device is specifically configured and designed to float with the same characteristics with or without the lower chamber attached. Thus, the lower chamber is optional.

FIG. 2 depicts a perspective of the Visual Distress Signal Device 10A illustrating the location of the upper lanyard attachment orifice 42 attached to the bulbous top portion 26, the cylindrical grip portion 30 having nonslip ribs 32 and the snap on storage compartment 34 with the distress flag lanyard orifice 43 on the lower edge.

FIG. 3 depicts a top view of the Visual Distress Signal Device 10A illustrating the conical upper surface 46 of the transparent lens 16 with the magnet protrusion 18. The ON and OFF positioning indicators 22 and 24 are on the bulbous top portion 26 of the water tight light housing 28.

Figure 4:
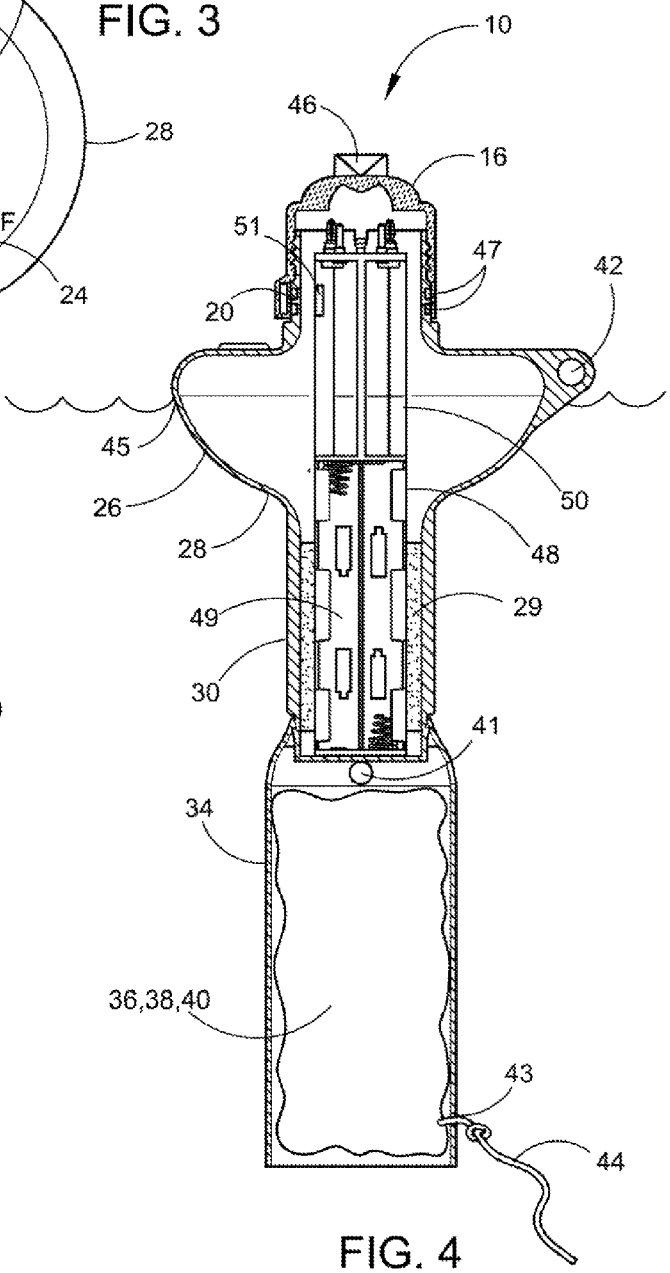
FIG. 4 depicts a cross section of the Visual Distress Signal Device illustrating the transparent lens, the location of the battery tray/circuit board perch assembly within the water tight outer housing and the snap on storage compartment that can house a Coast Guard approved distress flag or dye marker or a non-pyrotechnic smoke generating device.

FIG. 4 depicts a cross section of the Visual Distress Signal Device 10A illustrating the transparent lens 16, with the two O-ring seals 47, and the location of the battery tray/circuit board perch assembly 48 within the water tight light housing 28. The bottom of the battery tray/circuit board perch assembly 48 is incased with a soft cushioning material 29 within the cylindrical grip portion 30. The water line 45 is shown along the bulbous top portion 26 of the water tight light housing 28. The battery tray/circuit board perch assembly 48 is shown with the battery compartment 49 and the extended perch legs 50 with the electronic reed switch 51 attached. The extended perch legs 50 are connected to the circuit board mounting plate 52. The snap-on storage compartment 34 shown with a flag lanyard orifice 43, can house a Coast Guard approved distress flag 36, a dye marker pack 38 or a non-pyrotechnic smoke generating device 40.

Figure 5:
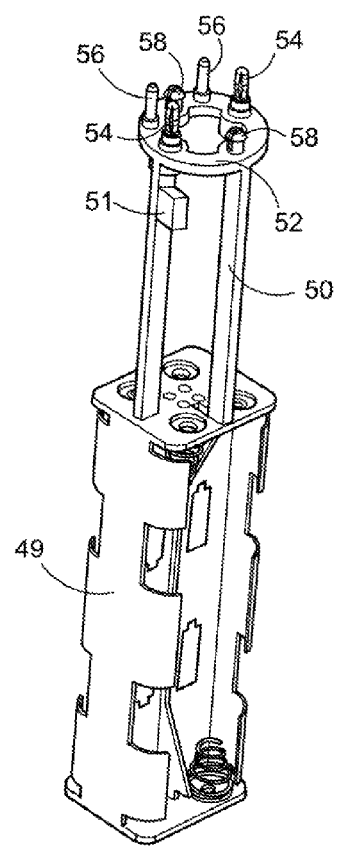
FIG. 5 depicts a perspective view of the battery tray/circuit board perch assembly.

FIG. 5 a perspective view of the battery tray/circuit board perch assembly 48 illustrating the battery compartment 49 and the extended perch legs 50 with the electronic reed switch 51 attached is shown connected to the circuit board mounting plate 52. The circuit board mounting plate 52 has on the upper surface two banana plugs 54, two alignment pins 56 and two snap-on couplings 58.

FIG. 6 depicts a cross section through the upper section of the transparent lens 16 defining the drain slots 66 and the general positioning of the ray patterns 60, 62 and 64 vertically and three hundred and sixty degrees through the transparent lens 16 from the LED light 65. The inner lens surface 68 directs light onto the upper internal reflection surface 70 of the conical segment 72, forming the light in a ray pattern 60 toward the horizon. The rays are not all perfectly parallel due to the faceted outer surface to add a bit of spread to the beam to help improve the tolerance due to manufacturing variations. The ray pattern 62 is directed through the inner concave surface 74 and in a horizontal direction through the outer convex surface 76 of the transparent lens 16 while the ray pattern 64 is directed at approximately fifteen degrees through the two flat surfaces 78 and 80 in the transparent lens 16 in a vertical direction. This image is from a real ray trace of a polar array of collimated beams put through the transparent lens 16.

FIG. 7 depicts a cross section through the upper section of the transparent lens 16 defining the light ray patterns 60, 62 and 64 and reflection surface 70 of the conical segment 72. The alternate embodiment of the transparent lens 16 will have a plurality of drain holes 84 slanting to the lower circumference of the conical segment 72 to drain water from the conical segment 72.

FIG. 8 depicts a side view of the circuit board 88 with a single LED light 65.

FIG. 9 depicts a top view of the circuit board 88 with a single LED light 65 with the large alignment tab 90 and the small alignment tab 92. Four holes in the circuit board 88 align to secure the circuit board 88 to the circuit board mounting plate. Electrical connectivity is made from the battery pack to the circuit board with two banana pins. Alignment tabs 90 and 92 on the board 88 allow the board 88 to be indexed to the upper watertight housing 28.

FIG. 10 depicts a top view of the circuit board 88 with a three LED's lights 65 and the large alignment tab 90 and the small alignment tab 92.

Figure 11:
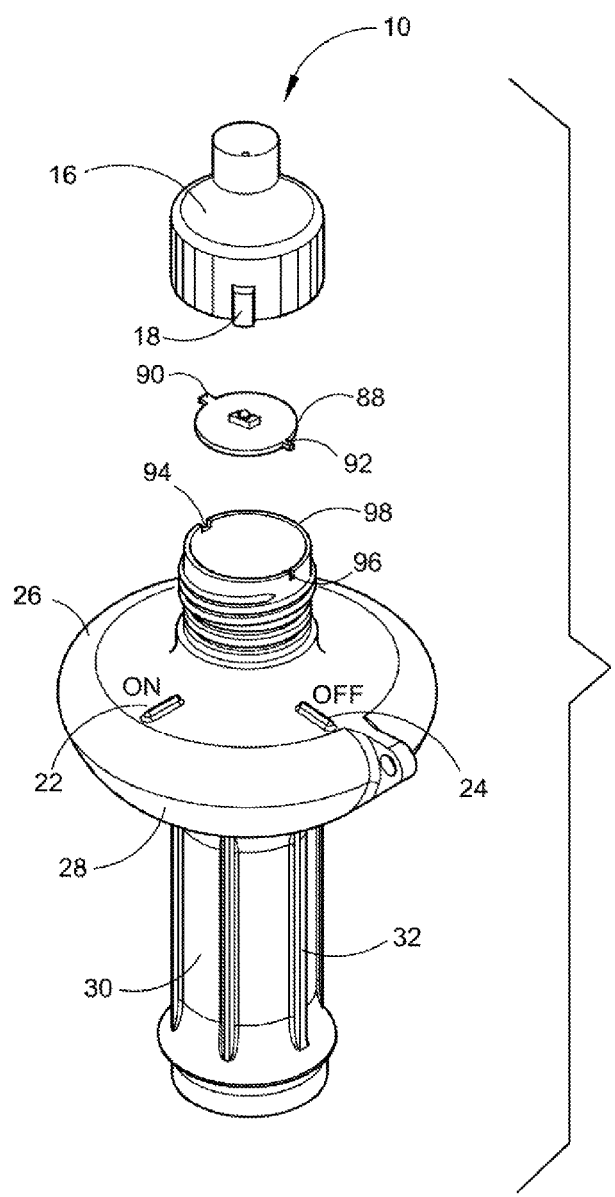
FIG. 11 depicts an exploded perspective view of the Visual Distress Signal Device illustrating locating slots for the battery tray/circuit board perch assembly in the rim of the water tight outer housing and the mating tabs on the sides of the circuit board.

FIG. 11 depicts an exploded perspective view of the Visual Distress Signal Device 10A illustrating the large alignment slot 94 and small alignment slot 96 for the positioning of the battery tray/circuit board perch assembly 48 (shown in FIG. 4). The slots are in the outer rim 98 of the water tight light housing 28 for the mating of the large alignment tab 90 and the small alignment tab 92 on the circuit board 88 in relation to the electronic reed switch 51 (shown in FIG. 4).

Figure 12:
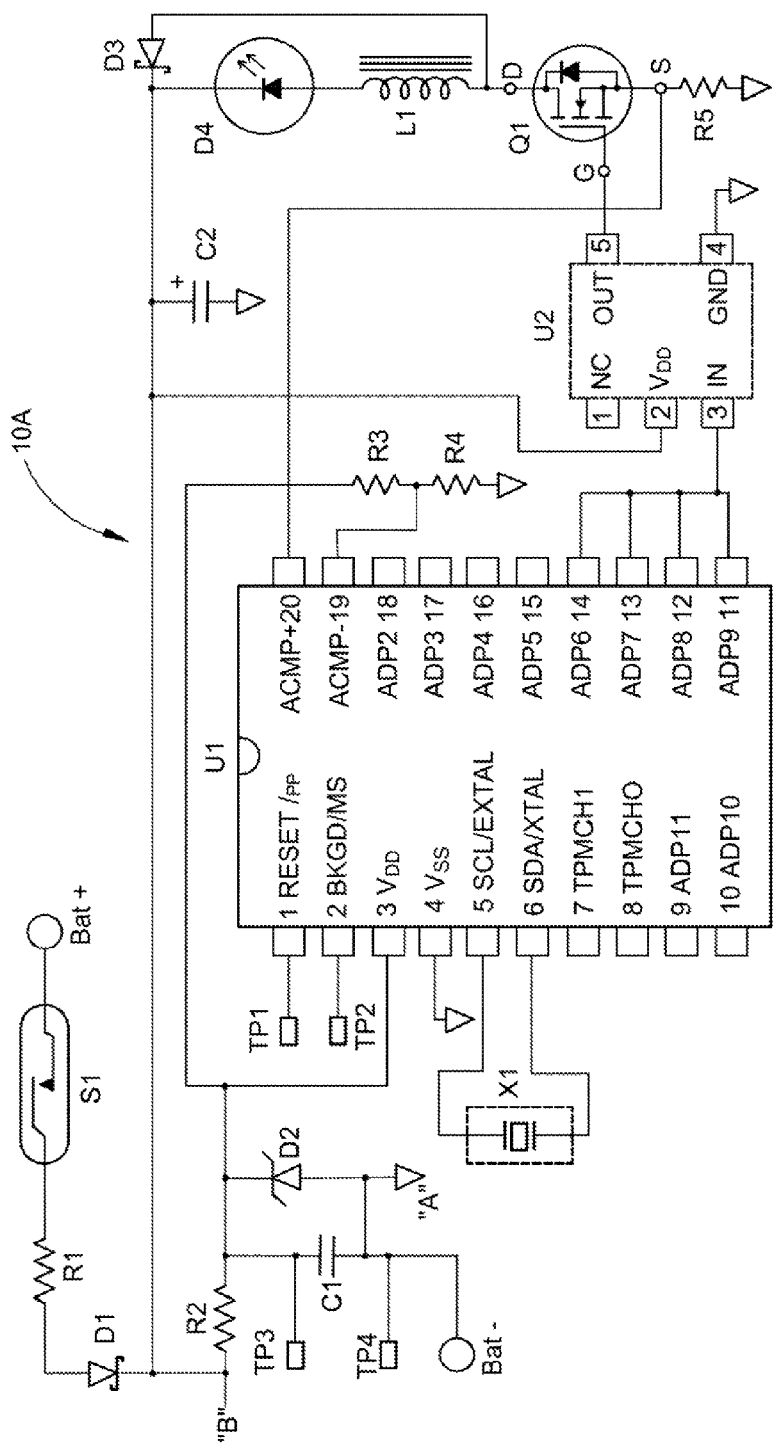
FIG. 12 depicts a schematic with a single LED.

FIG. 12 depicts a schematic for Visual Distress Signal Device 10A with a single LED (D4), that details that the circuit is controlled by a microcontroller or processor (U1) that is controlled by software. The circuit is energized by a power source supplied to Bat+ and Bat−. The circuit has inputs TP1 through TP4 that enable "In circuit programming". The power source is controlled by reed switch (S1). R1 acts to limit the inrush current going to the storage capacitor (C2). Reverse power source protection is provided by (D1). Since the power source can be variable, the zener (D2) regulates the voltage supplying power to the microcontroller (U1). Frequency control is provided by a crystal (X1) in this example, but can be provided by any frequency regulating device. The output of the microprocessor controls a pass element, in this example a MOSFET (Q1), which is driven by a MOSFET Driver (U2). This pass element allows current to flow through a light emitting source, in this example an LED (D4), an inductor (L1), and a current sense element, in this example, a resistor (R5). When Q1 is turned on, the current builds up a magnetic field in the inductor (L1) storing energy. When Q1 is turned off, inductor (L1) supplies current through D3, continuing to power the LED (D4), until the field in inductor (L1) collapses.

The microcontroller senses the current, in this example by using an internal comparator (ACMP+ and ACMP−) to compare the voltage across R5 that represents the current, to a voltage supplied by a reference, in this example a voltage provided by a voltage divider R3 and R4. This controls the peak current. Points "A" and "B" are for wiring an alternate electronic switch to the reed switch shown and described above (see FIG. 19).

Figure 13:
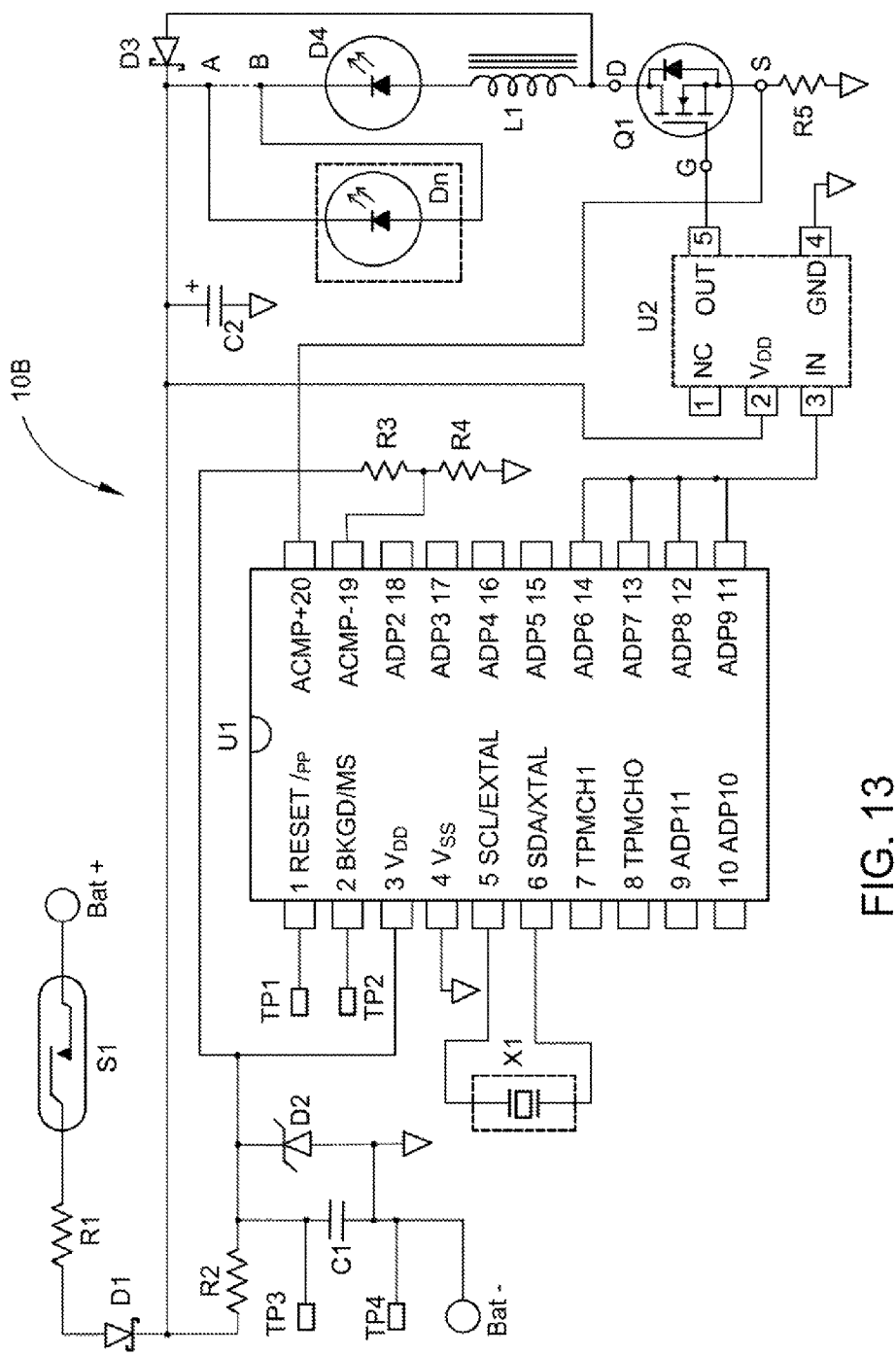
FIG. 13 depicts a similar schematic with multiple LED's.

FIG. 13 depicts a schematic for Visual Distress Signal Device 10B with similar characteristics except having the option of having multiple LED lights 65.

Figure 14:
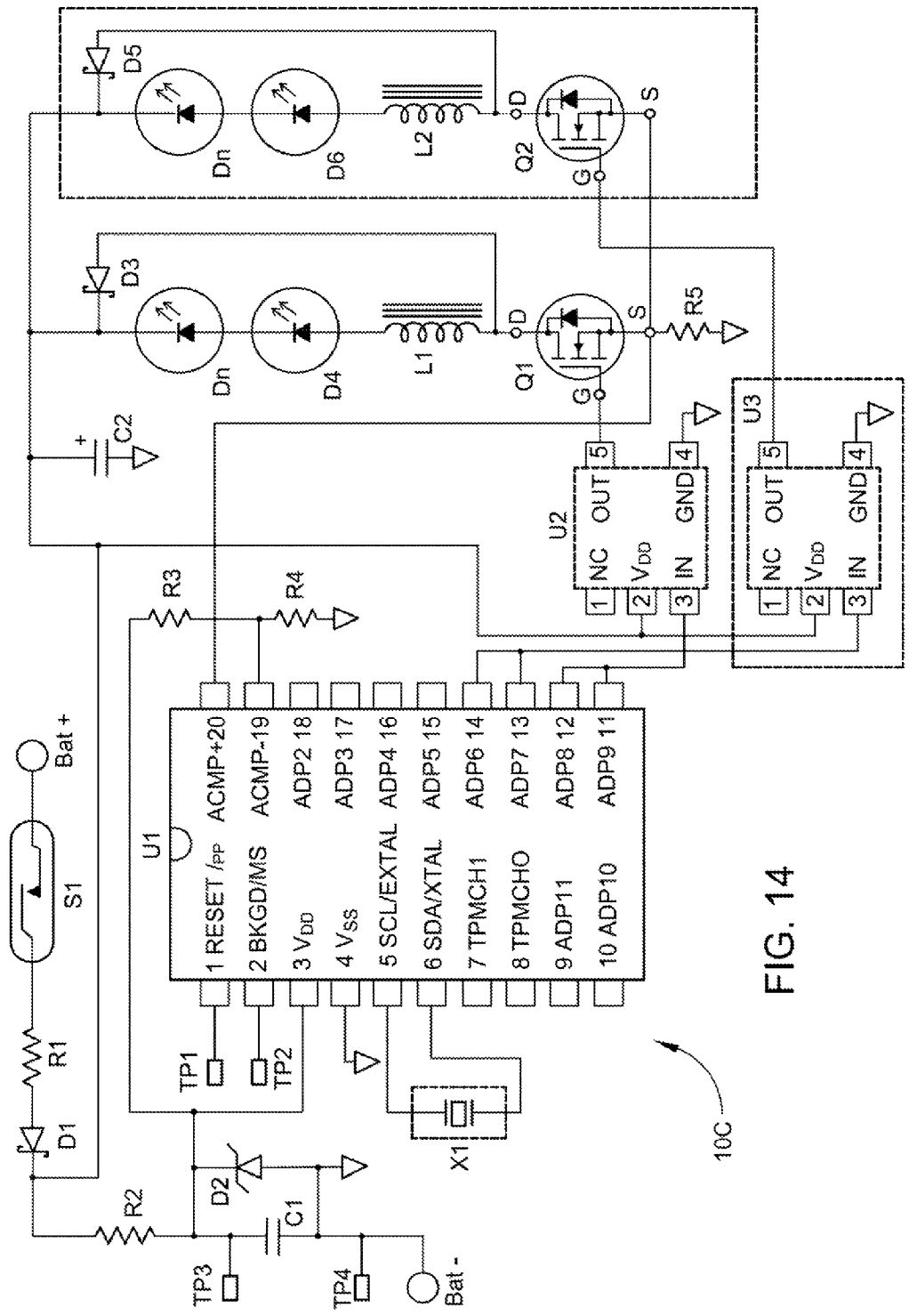
FIG. 14 depicts a similar schematic with multiple LED's and an embedded transmitter.

Referring now to FIG. 14, there is shown a similar schematic for Visual Distress Signal Device 10C with multiple LED's and an embedded beacon transmitter. A circuit controlled by a microcontroller or processor (U1) that is controlled by software. The circuit is energized by a power source supplied to Bat+ and Bat−. The circuit has inputs TP1 through TP4 that enable "In circuit programming". The power source is controlled by a switch. In this example, this is a reed switch (S1). R1 acts to limit the inrush current going to the storage capacitor (C2). Reverse power source protection is provided by (D1). Since the power source can be variable, the zener (D2) regulates the voltage supplying power to the microcontroller (U1). Frequency control is provided by a crystal (X1) in this example, but can be provided by any frequency regulating device. The output of the microprocessor controls a pass element, in this example a MOSFET (Q1), which is driven by a MOSFET Driver (U2). This pass element allows current to flow through a light emitting source, in this example an LED (D4), an inductor (L1), and a current sense element, in this example, a resistor (R5).

The light source can be a single element like an LED or multiple elements represented by "Dn" and placed in series illustrated by the dotted line trace. When Q1 is turned on, the current builds up a magnetic field in the inductor (L1) storing energy. When Q1 is turned off, L1 supplies current through D3, continuing to power the LED until the field in L1 collapses. The microcontroller senses the current, in this example by using an internal comparator (ACMP+ and ACMP−) to compare the voltage across R5 that represents the current, to a voltage supplied by a reference, in this example a voltage provided by a voltage divider R3 and R4. This controls the peak current.

Another embodiment would have multiple additional drivers and light sources, represented by the example additional circuit in the dotted box within for Visual Distress Signal Device 10C as shown in FIG. 14. This allows lighting separate light sources in different patterns and at different times.

The Algorithm for Visual Distress Signal Device 10C would function as follows: the switch is first turned on to power the circuit. Then Q1 is turned on. The current through the LED and inductor ramps up until the current through the current sense element matches the reference. Then Q1 is turned off and L1 continues to supply the current through D3 until its stored energy is exhausted. After some delay, Q1 is turned on again and the cycle repeats. This cycle repeats during the time the light source is intended to be on. Various light patterns, random and defined, can be constructed by turning this cycle on and off. For example an S O S pattern for a marine beacon.

An additional embodiment would provide additional drivers allowing multiple circuits to use this algorithm independently.

Figure 15:
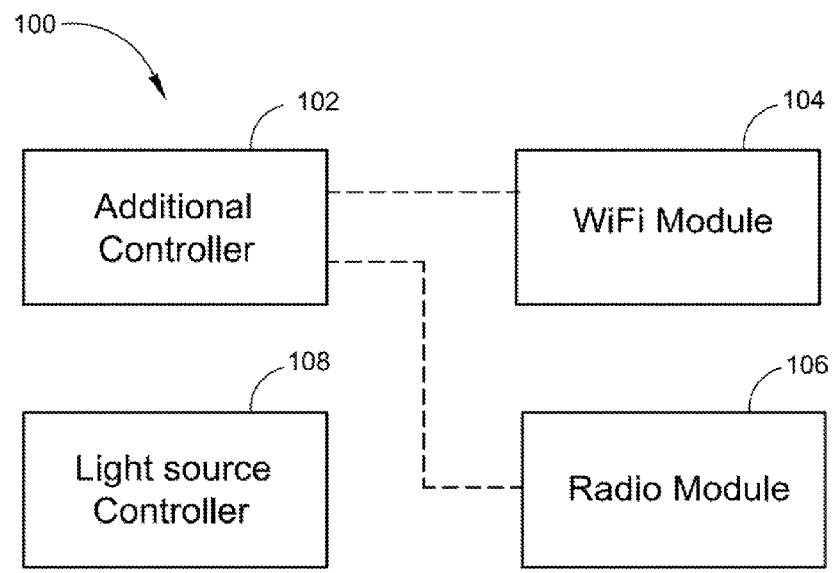
FIG. 15 depicts a communications flow diagram of an additional controller in communication with a global positioning system (GPS) transmitter utilizing Internet connectivity or a WiFi module and a radio module, with a light source controller present.

FIG. 15 depicts a communications flow diagram 100 of an additional controller in communication with a WiFi module and a radio module, with a light source controller present. An additional controller 102 is in communication with a WiFi module 104, and a radio module 106. A light source controller 108 is also present.

Figure 16:
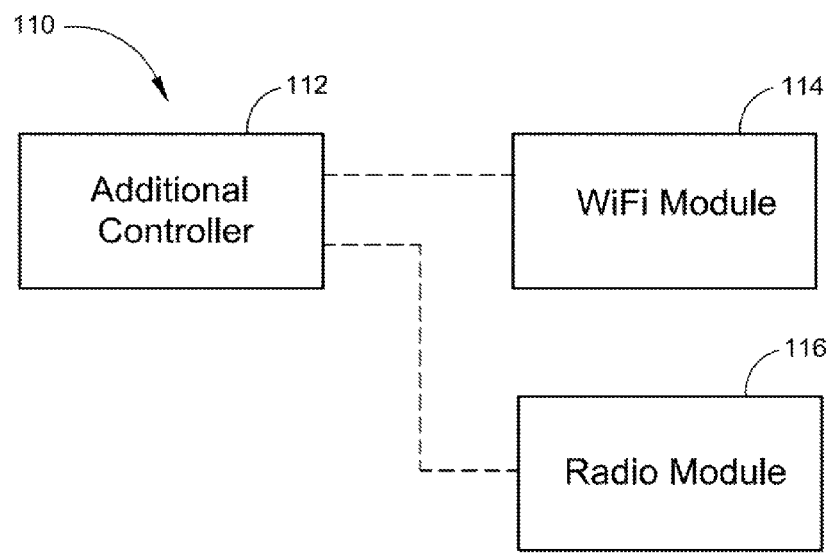
FIG. 16 depicts a communications flow diagram of an additional controller in communication with a GPS transmitter utilizing Internet connectivity or WiFi module and a radio module.

FIG. 16 depicts a communications flow diagram 110 of an additional controller in communication with a WiFi module and a radio module. An additional controller 112 is in communication with a WiFi module 114, and a radio module 116.

The alert system functions as follows: either an additional micro-controller or an enhanced version of the micro-controller that blinks the light source can be used to interface with an alert system. It can be interfaced with a WiFi Module such as a Freescale TWR-WIFI-AR4100 or a Radio Module such as a Maxim SKY77555 or a conventional transmitter circuit to transmit the information. The WiFi module could be setup as a WiFi hotspot with a web-page displaying an alert. Anyone in range looking for this hotspot would see the alert for example in a cellphone application. It could display the name of the vessel and the location for example. See FIGS. 15 and 16.

Another embodiment would allow the application to contact a server which monitors the GPS coordinates of its users. Users within an appropriate distance, or land based contacts which are user defined, would be notified by an alert in the form of a text, email, or any combination of these. See FIGS. 15 and 16. The alert can also be in the form of a phone call or an alert message sent to a server through the mobile application. The server can also send alerts to the Coast Guard or equivalent agency, a towing or vessel assist service, search and rescue (SAR) personnel, emergency medical systems (EMS) personnel, the cloud, the Rescue Coordination Center, and/or other land-based resources as necessary.

A third embodiment would use a radio module to send out the alert or contact the Coast Guard. See FIGS. 15 and 16.

Any combination of these could be used together. See FIGS. 15 and 16.

Figure 17:
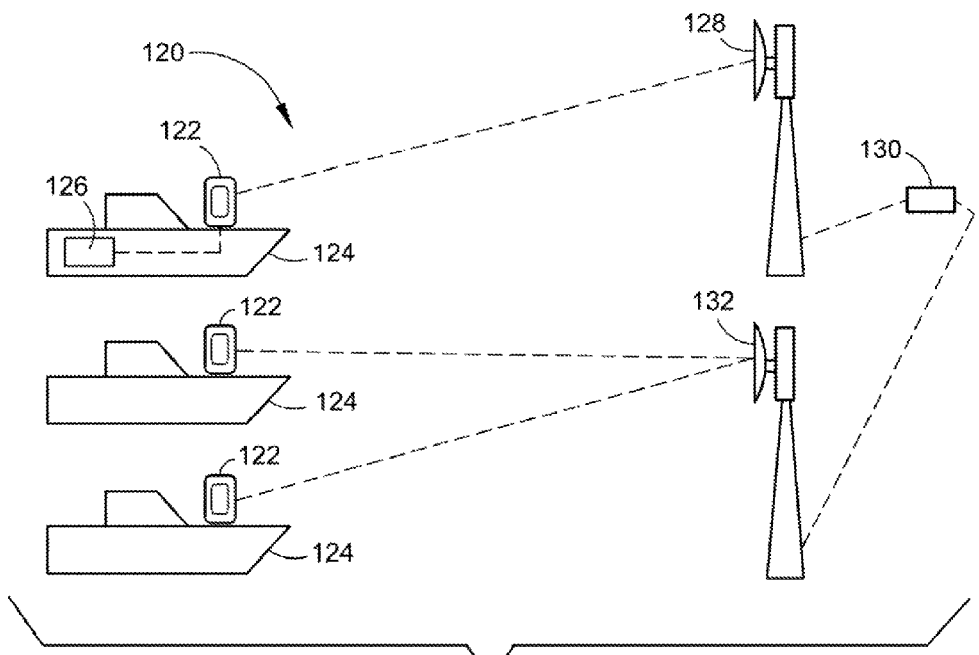
FIG. 17 depicts a communication system wherein a GPS device can interface with the Internet using a cell phone transmitter adaptor and mobile application software to provide a Visual Distress Signal Device unit which includes a PCB having an integrated electronic beacon with capability for GPS, cell phone, WiFi and Internet connectivity through a common server.

FIG. 17 depicts a communication system 120 wherein a GPS device can interface with the Internet using a cell phone transmitter adaptor with mobile application software 122 to provide a connected Visual Distress Signal Device unit 126 on board a vessel 124. The cell phone transmitter adaptor with mobile application software 122 connected Visual Distress Signal Device unit 126 includes a PCB having an integrated electronic beacon with capability for GPS, cell phone, WiFi and Internet connectivity through a common server 130 in communication with cell phone towers 128 and 132.

For enabling an Internet link, a unit with a GPS can interface with the Internet using a cell phone adaptor such as the ones available from most cell phone companies to connect to a laptop (see FIG. 17). The information describing the location and vessel identification and nature of the distress can be sent to a server on the Internet. The server can compare the location of the vessel in distress with the database of locations of other vessels in the area. This database can be derived from the cell phones of users of the software application in the area. This software application would periodically transmit the location and nature of distress or other predefined message content from of the user's phone. The server would alert the vessels in the area or land based contacts (user defined i.e. contact list in phone or assistance resources, for example commercial towing, vessel assist or Coast Guard by sending a text an alert in the software mobile application on the phone, a text message, a phone call, an email, or some combination of these alert forms.

Figure 18:
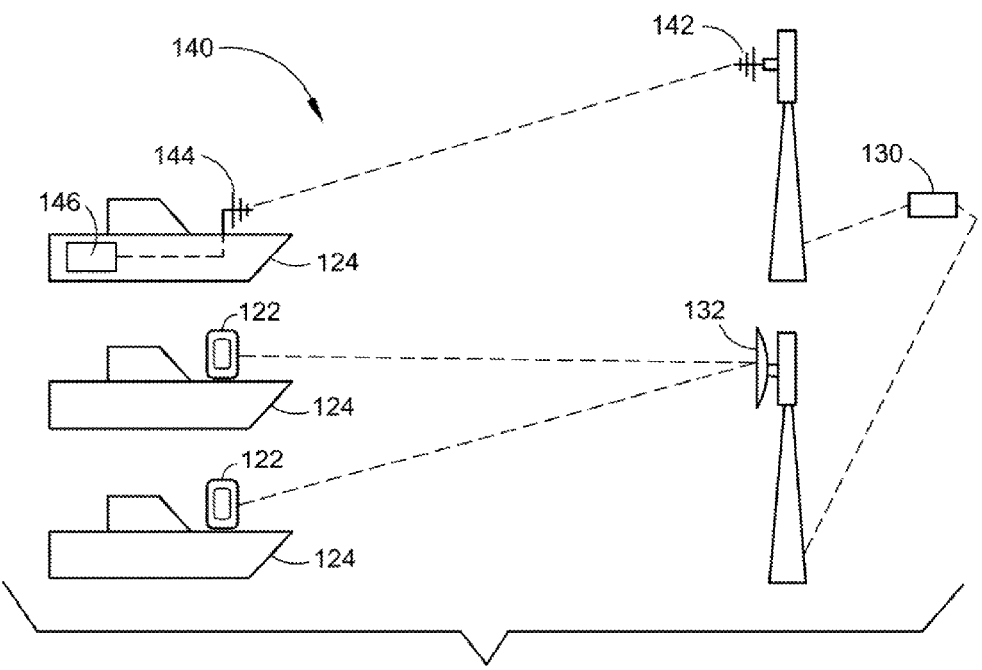
FIG. 18 depicts a communication system wherein a GPS device can interface with a radio transmitter to provide a Visual Distress Signal Device unit which includes a PCB having an integrated electronic beacon with capability for GPS, cell phone, WiFi and Internet connectivity through a common server.

FIG. 18 depicts a communication system 140 wherein a GPS device can interface with the Internet using a radio transmitter 144 to provide a connected Visual Distress Signal Device unit 146 on board a vessel 124. The radio transmitter 144 connected to the Visual Distress Signal Device unit 146 on board a vessel 124, includes a PCB having an integrated electronic beacon with capability for GPS, cell phone, WiFi and Internet connectivity through a common server 130 in communication with radio tower 142 and cell phone tower 132.

For enabling a radio link, a unit with a GPS can interface with the Internet using a radio transmitter (see FIG. 18). The information describing the location and vessel identification can be sent to a server on the Internet. The server can compare the location of the vessel in distress with the database of locations of other vessels in the area. This database can be derived from the cell phones of users of the software application in the area. This software application would periodically transmit the location and nature of distress or other predefined message content from of the user's phone. The server would alert the vessels in the area or land based contacts (user defined i.e. contact list in phone or assistance resources, for example commercial towing, vessel assist or Coast Guard by sending a text an alert in the software mobile application on the phone, a text message, a phone call, an email, or some combination of these alert forms.

Another embodiment of the alert system anticipates a cellphone application. This application would present a web page to enter the vessel's information. The GPS present in the cellphone would pass the location information to the application. Periodically, this information would be sent by the cellphone via the internet to a central server. This would allow a program on the server to know the location of all of the cellphones using the application. A person on the vessel could activate the alert function of the application. The cellphone would send the alert to the server which would compare the location of the cellphone that issued the alert and the location of the other cell phones in the area. The server would relay the alert the alert to all of the cellphones using the application within a given radius of the cellphone that issued the alert.

Figure 19:
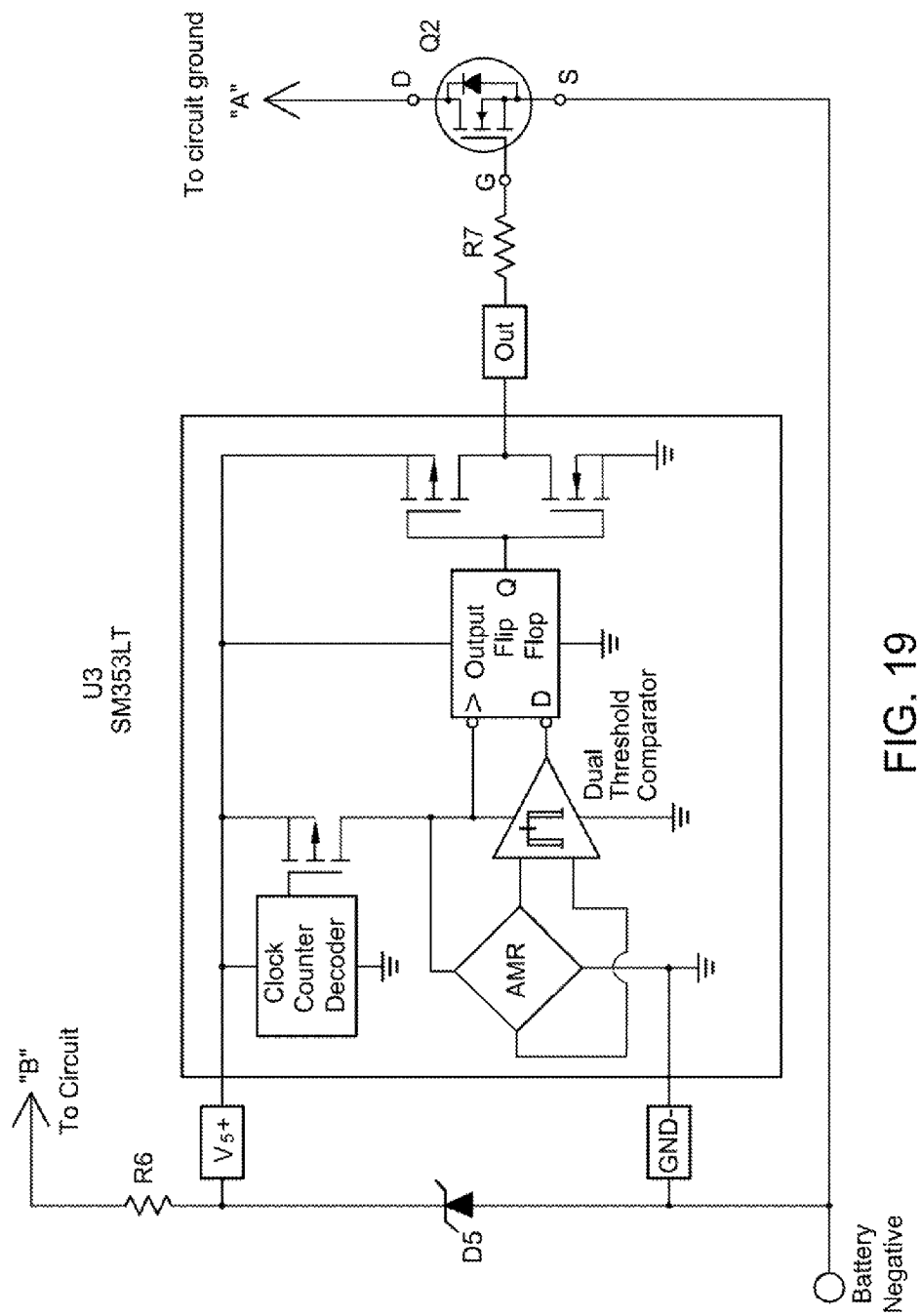
FIG. 19 depicts an alternate embodiment electronic version of the reed switch in the form of an SM353LT electronic switch, which is activated by a magnetic field.

Referring now to FIG. 19 there is illustrated an electronic version of the reed switch in the form of a SM353LT electronic switch which is activated by a magnetic field. This electronic version of the reed switch is wired to the schematic shown in FIG. 12 by way of the "A" point to the circuit ground, and the "B" to the circuit (see the "A" and the "B" points clearly shown in FIG. 12). The SM353LT is an off the shelf available electronic switch activated by a magnetic field. In an alternate embodiment, using the SM353LT, the magnet that would control the reed switch would instead control the SM353LT. D5 is a zener diode and regulates the voltage across U3. R6 limits the current to U3 and to the zener. U3 turns on when subjected to a magnetic field. This turns on Q2 through R7, a current limiting resistor. The rest of the circuit works as in the previous version. Alternatively, a mechanical switch for activation of the circuit in an on/off or test mode could be utilized.

Figure 20:
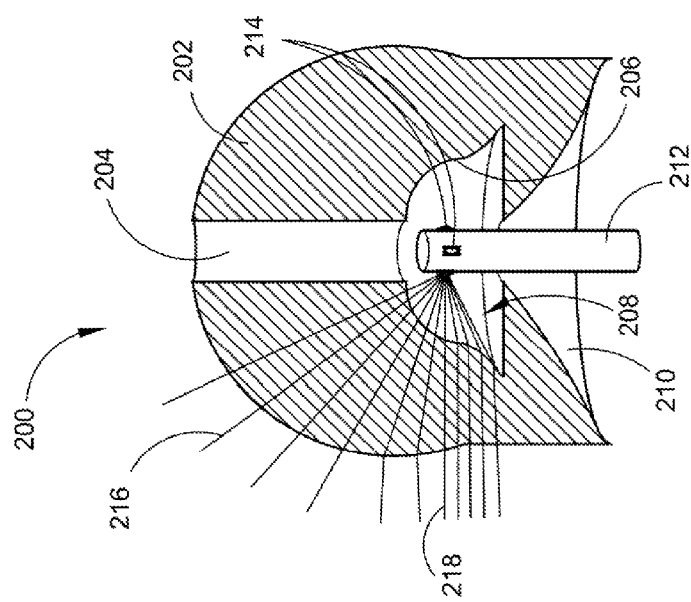
FIG. 20 depicts a lens configuration having an array of LED's mounted on a centrally located post, illustrating the light distribution.

FIG. 20 depicts a lens configuration having an array of LED's mounted on a centrally located post, illustrating the light distribution. The lens assembly 200 is comprised of a lens body 202 having a central cavity 204. The inner surfaces are comprised of an upper portion 206 having a bell shaped inner chamber 208, and a lower conical inner surface 210. A centrally located beacon heatsink post 212 has an array of LED's 214 mounted thereon, such that light diffraction rays 216 and 218 are generated.

Figure 21:
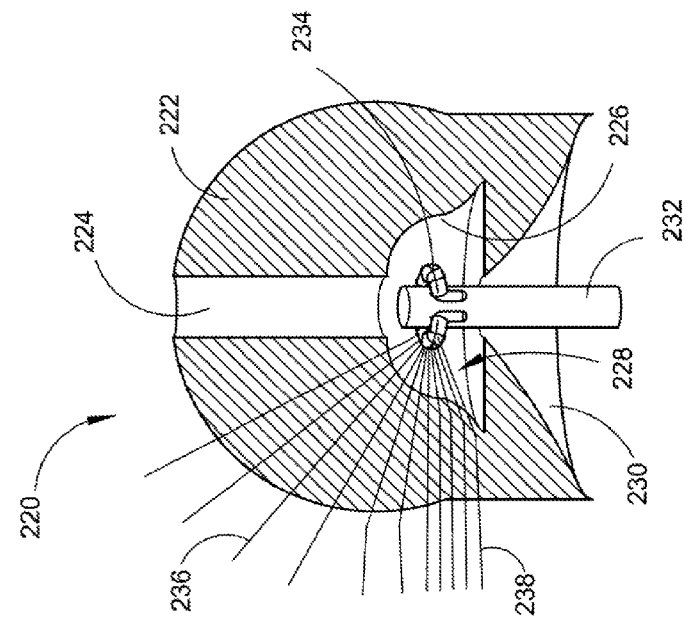
FIG. 21 depicts a lens configuration having a flashtube mounted on a centrally located post, illustrating the light distribution.

FIG. 21 depicts a lens configuration having a flashtube mounted on a centrally located post, illustrating the light distribution. Similar to the lens configuration in FIG. 20, the lens assembly 220 in FIG. 21 is comprised of a lens body 222 having a central cavity 224. The inner surfaces are comprised of an upper portion 226 having a bell shaped inner chamber, and a lower conical inner surface 230. A centrally located beacon heatsink post 232 has a flashtube 234 mounted thereon, such that light diffraction rays 236 and 238 are generated. Another light source could be a flash tube. The importance of another light source being a flash tube, or one or more flashtubes, is that it can be very bright. A flash tube such as shown in FIG. 21 is driven by a high voltage supply and is triggered by an electrode on the side of the glass. The two electrodes at each ends of the flash tube 234 are presented with a high voltage that is just short of arcing through the tube. The electrical discharge through the flash tube is triggered by presenting the center electrode with a high voltage. Moreover, this flash tube 234 could be coated with a conversion phosphor; one that takes the smaller wavelength light and converts it to higher wavelength light, changing the color distribution of the light. Another embodiment would use a filter that would be placed over the flash tube to select certain colors and/or wavelengths within the full range of visible and invisible light, such as infrared (IR) and ultraviolet (UV). These circular flash tubes would be supported by clips that are attached to a central post placed in the center of the lens assembly 220. The novelty of this approach is that the light from the flash tubes can be evenly distributed around the ring as opposed to the light distribution from individual sources such as LEDs.

The lens body 202 is composed of two sections: the bottom section is angled toward the horizon and angled up 15 degrees. The top section is aimed 15 degrees to straight up. It is intended to be used to configure the distribution of light from a ring of LED's placed in a radial direction. The lenses 202 and 222 have the novelty of being able to distribute more light in the horizontal direction gradually dimming as the angular elevation increases (see the light distribution graph in FIG. 22). This lens configuration also cuts back on the light going below the horizon. The radii and dimensions can be varied to accommodate the number and type of light source required, whether it is in the form of an array of LED's or a flashtube, or the like.

Thus, the novelty of the lens shape (bell shaped inner chamber) is in the fact it directs the light from a ring or array of LEDs or other light source such as a flash tube preferably but not limited to in a radial pattern with the intensity concentrated from the horizontal plane to some angle; 30 degrees for an example. This is important because the power required for a beacon is proportional to the total light (see FIG. 22 below).

Figure 22:
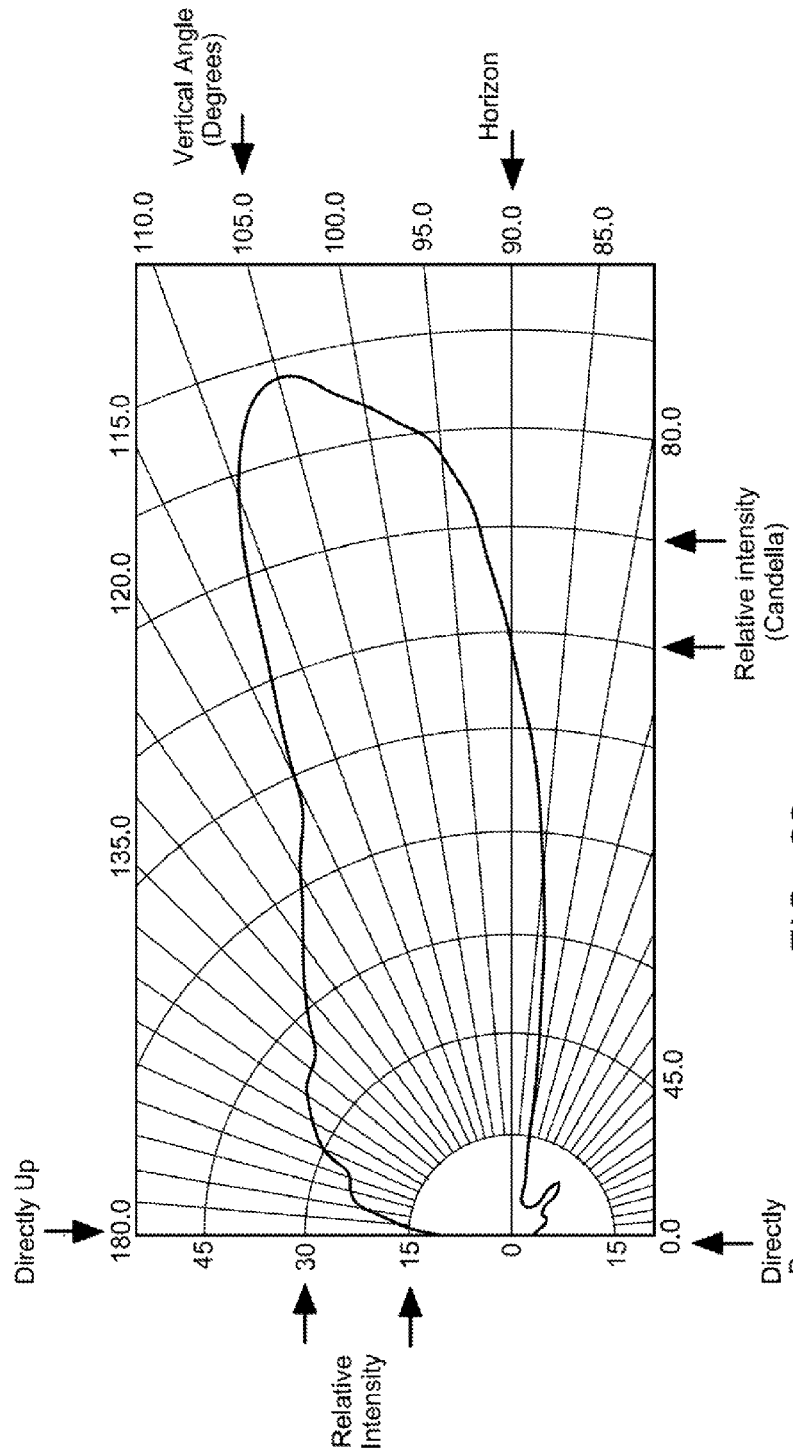
FIG. 22 depicts a chart graphically illustrating the light distribution by candela and vertical degrees of angle.

FIG. 22 depicts a chart graphically illustrating the light distribution by candela and vertical degrees of angle. It shows the distribution of light from the beacon lens in relative intensity (candela) and vertical angle in degrees for the entire 0 degrees straight down to 180 degrees straight up.

Figure 23A:
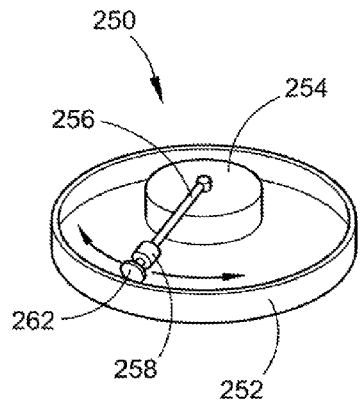
FIG. 23A and FIG. 23B depict (A) a beacon housing including a mechanical power recharge mechanism that works by wave motion, and (B) an inductively coupled energy storage charging device.

FIG. 23A depicts a beacon housing including a mechanical power recharge mechanism that works by wave motion. Within the beacon there can be located this wave motion power supplying mechanism 250 for generating power to be stored or to charge a battery. The beacon housing 252 has a centrally located generator 254 and a swing support arm 256 including a roller weight 258 and spacer 260. During wave action, the sing support arm 256 moves along the indicated arrow within the beacon housing 252, and with the aid of the roller weight 258, that swinging rolling motion is transmitted to the generator 254 to generate power directly from wave motion.

Figure 23B:
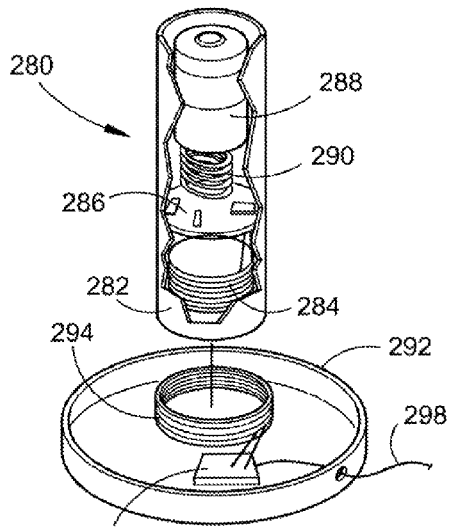

FIG. 23B depicts an induction charging system 280 where a beacon housing 282 having a beacon unit coil 284 coupled to a printed circuit board (PCB) 286 in contact with an energy storage device 288, here a battery, through a spring 290, can be placed in a base 292 to be charged inductively. The base 292 includes a base coil 294 wired to a printed wiring assembly 296 which is connected to a power generation source 298. The power generation source could be AC, DC, solar or mechanical. In this way, the charging elements for the energy storage elements can be inductively coupled to the energy storage devices. The base 292 would contain a printed wiring assembly 296 which would interface with the charging element; solar cells, AC voltage from the mains, etc. This assembly would contain an oscillator circuit which would drive a base coil 294. The bottom of the beacon housing 282 could be inserted in the coil in the base. The device would also contain a beacon unit coil 284 which would be inductively coupled to the coil 294 in the base. This beacon unit coil 284 would be connected to a printed (PCB) wiring assembly 286 that would rectify the induced current, and regulate the voltage charging the energy storage device 288 housed within the beacon unit 282. This would allow the beacon unit to be charged without having to physically connect the device to the base.

Figure 24:
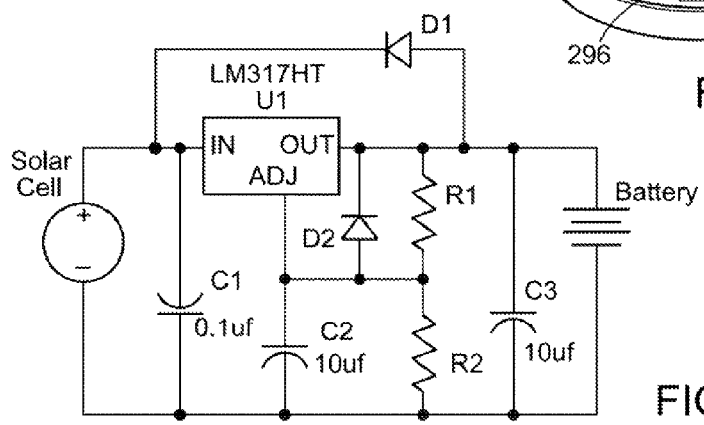
FIG. 24 depicts a circuit schematic of solar cells used to power and recharge the energy storage elements, here a battery, within the beacon.
Figure 25:
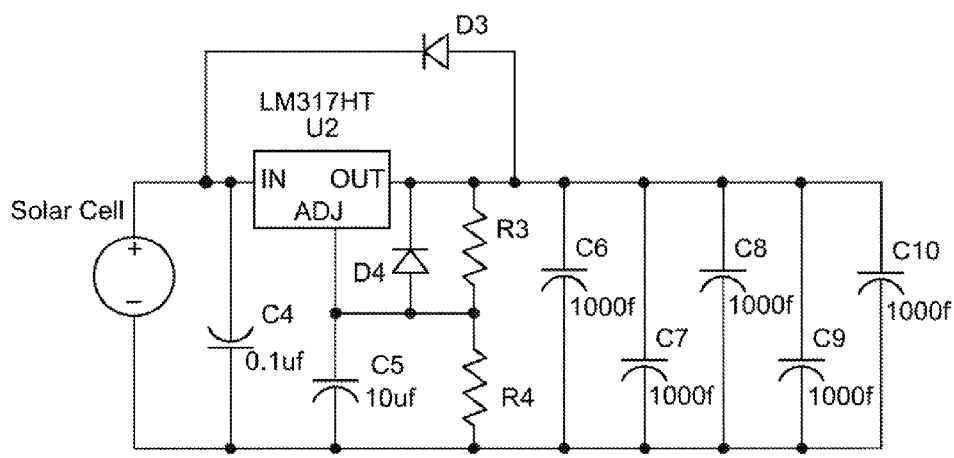
FIG. 25 depicts a circuit schematic of solar cells used to power and recharge the energy storage elements, here a capacitor array, within the beacon.

FIG. 24 depicts a circuit schematic of solar cells used to power and recharge the energy storage elements, here a battery, within the beacon. Therefore, the beacon's energy storage element can be recharged in a number of ways: (1) since the waves in the ocean rock floating objects, a mechanism using this principle can be used to charge the energy storage element (see FIG. 23 above). A regulator circuit such as shown in in FIGS. 24 and 25, where this mechanism replaces the solar cell, can be used to prevent overcharging; and (2) solar cells can also be used to charge energy storage elements as shown in FIGS. 24 and 25. In FIG. 24, the solar cells can charge the battery, with the regulator limiting the voltage to prevent overcharging the battery. Another embodiment charges another energy storage element; a group of capacitors. Again, the solar cells can charge the capacitor array, with the regulator limiting the voltage to prevent overcharging the array.

FIG. 25 depicts a circuit schematic of solar cells used to power and recharge the energy storage elements, here a capacitor array, within the beacon. The energy equivalent of capacitors is ($\frac{1}{2}$ C (V1×V1))−($\frac{1}{2}$ C (V2×V2)) where C is the total capacitance, V1 is the higher (charged) voltage and V2 is the lower (discharged) voltage. Capacitors have the advantage over batteries in that they can often be recharged hundreds of thousands of times. They can be recharged very quickly.

Different regulators can be used to limit the voltage and/or current charging the energy storage element. A switching regulator or a linear regulator can be used. The regulating circuit prevents overcharging the storage element. The voltage from the regulator is determined by the following formula:

$$V_{OUT} = 1.25 \text{ V}\left(1 + \frac{R2}{R1}\right) + I_{ADJ}(R_2)$$

Figure 26:
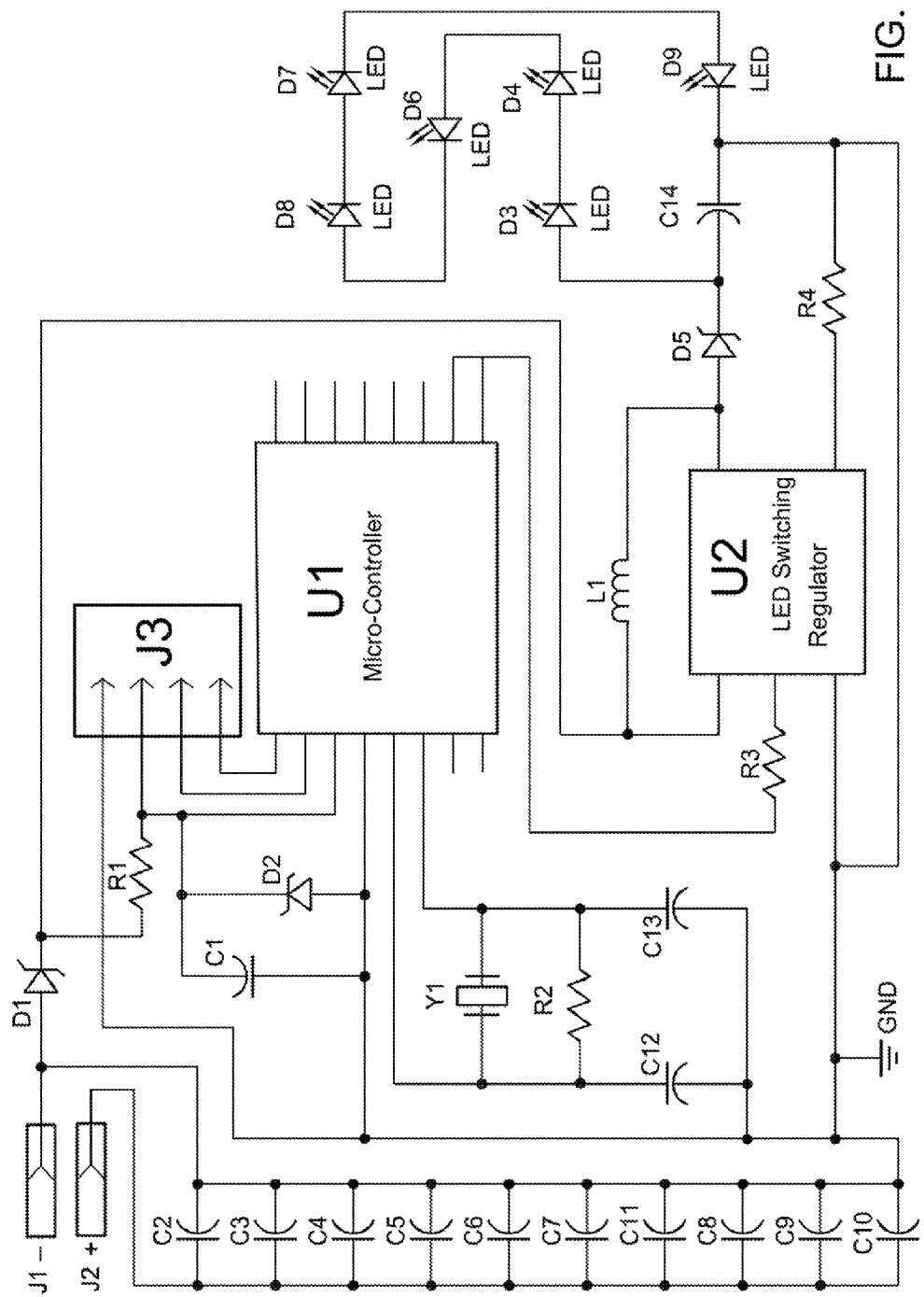
FIG. 26 depicts a circuit schematic in which the beacon is powered by a battery, capacitor array or fuel cell.

FIG. 26 depicts a circuit schematic in which the beacon is powered by a battery, capacitor array or fuel cell.

Energy storage devices such as these batteries and capacitive arrays, in addition to fuel cells (such as Brunton Hydrogen Reactor Portable Power Pack F-REACTOR-YL) could power a distress beacon. An example of such a circuit is shown in FIG. 26 where U1 would be a microcontroller and U2 would be an LED switching regulator. Another circuit without a microcontroller is shown in FIG. 27 below.

Figure 27:
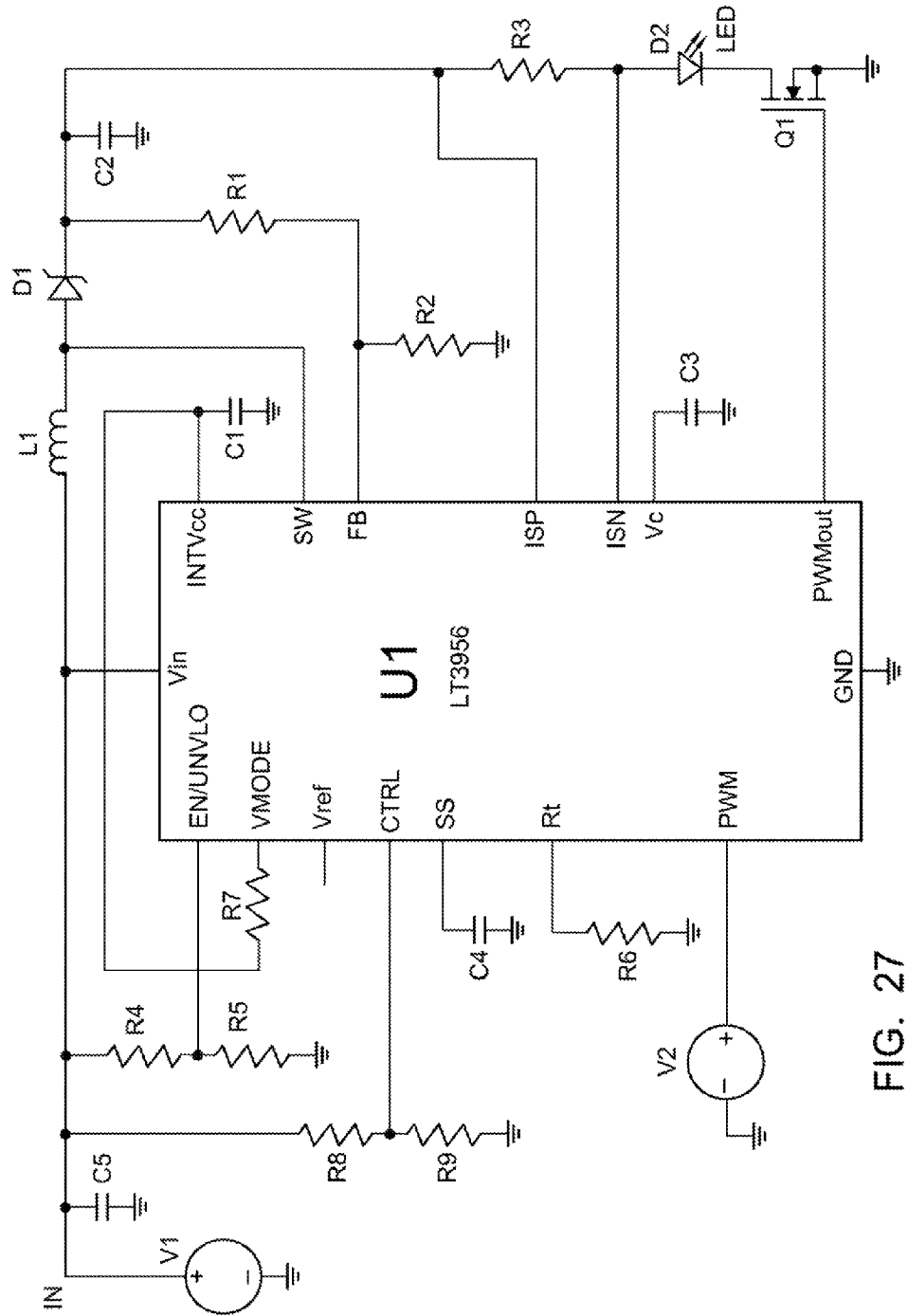
FIG. 27 depicts another circuit schematic in which the beacon is powered by a battery, capacitor array or fuel cell, here illustrated without a microcontroller element present.

FIG. 27 depicts another circuit schematic in which the beacon is powered by a battery, capacitor array or fuel cell, here illustrated without a microcontroller element present.

Figure 28:
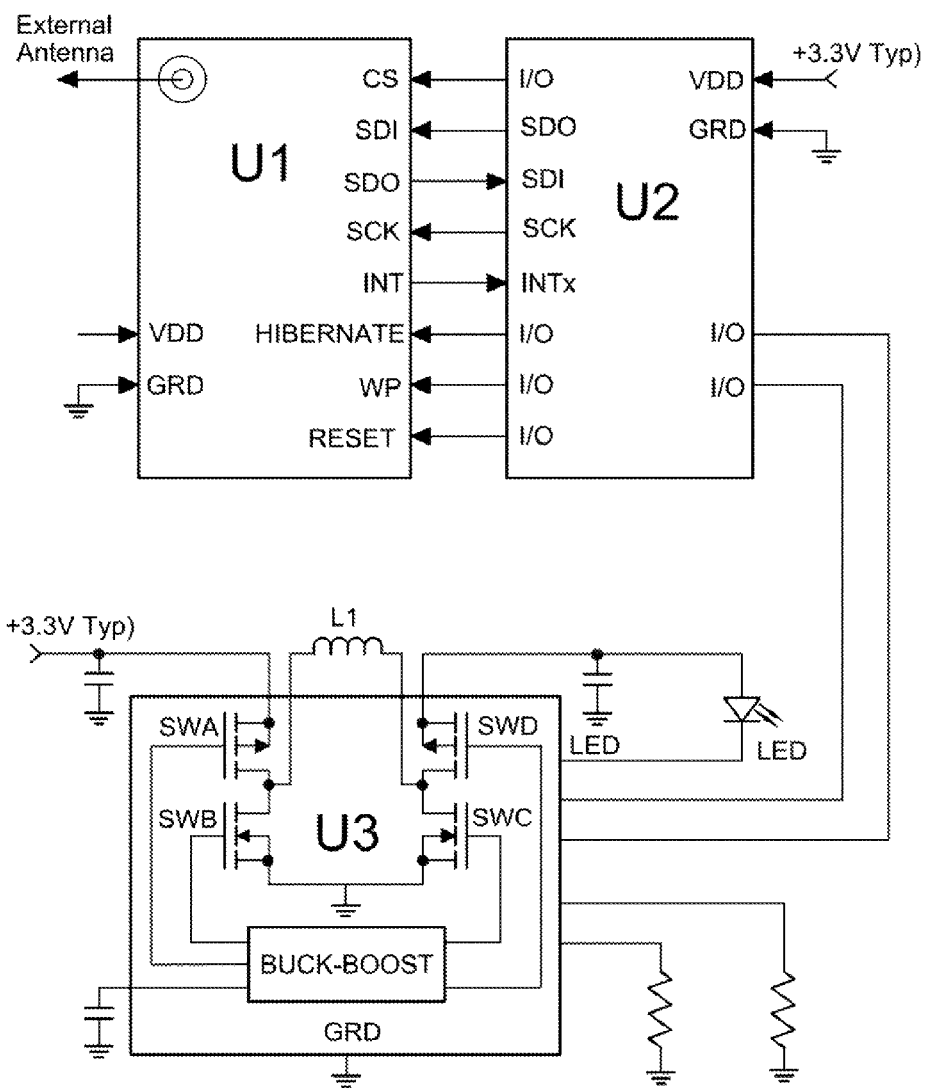
FIG. 28 depicts a circuit schematic of a beacon including a wireless module, a microcontroller and an LED regulator.

FIG. 28 depicts a circuit schematic of a beacon including a wireless module, a microcontroller and an LED regulator. This beacon can include light sources of different colors and individual controlled flash patterns. It can include light sources such as flash tubes, LEDs or other infrared emitters within either the horizontal or vertical directions within the near IR wavelength and or far IR wavelength; from 700 nm to 1 mm wavelength. This will offer added detection of the Distress Light. Manned aircraft utilizing military or commercial grade Monocular Night Vision Devices (MNVD) with supplemental IR illumination greatly increases the distance at which the distress light can be located. Also, /drones/surface craft or satellites with IR detection systems will be effective.

Figure 29:
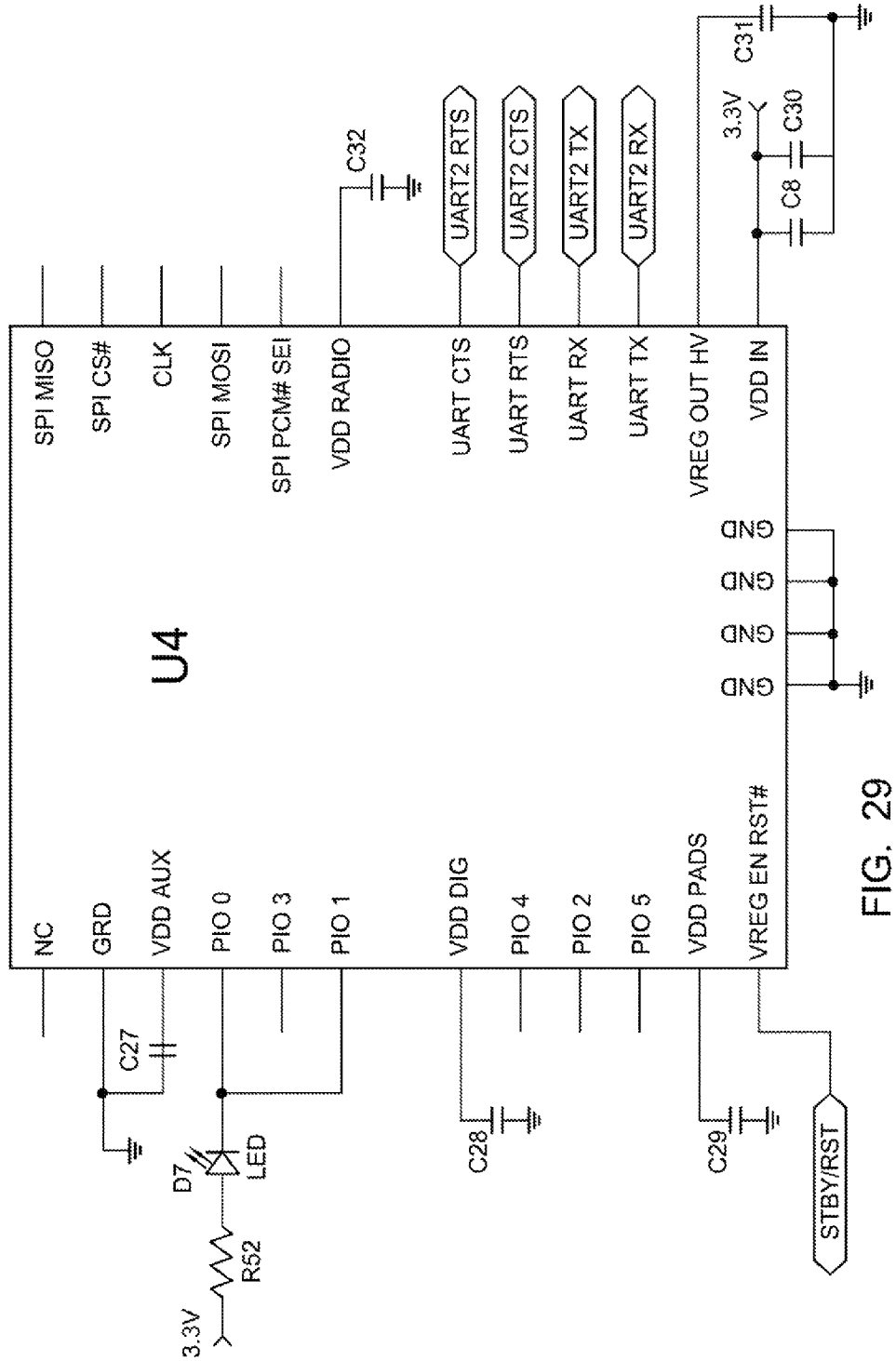
FIG. 29 depicts a circuit schematic of a beacon including a Bluetooth module in place of or in addition to a wireless module, a microcontroller and an LED regulator.

FIG. 29 depicts a circuit schematic of a beacon including a Bluetooth module in place of, or in addition to, a wireless module, a microcontroller and an LED regulator. FIG. 28 shows an embodiment of the beacon that includes a wireless module (U1), a microcontroller (U2) and an LED regulator (U3). This can be used with the Come Quick Distress Application mobile smartphone application as described in FIGS. 30 through 39 below. Another embodiment uses a Bluetooth module as shown in FIG. 29 that can be used in place of, or in addition to, the wireless module.

Figure 30:
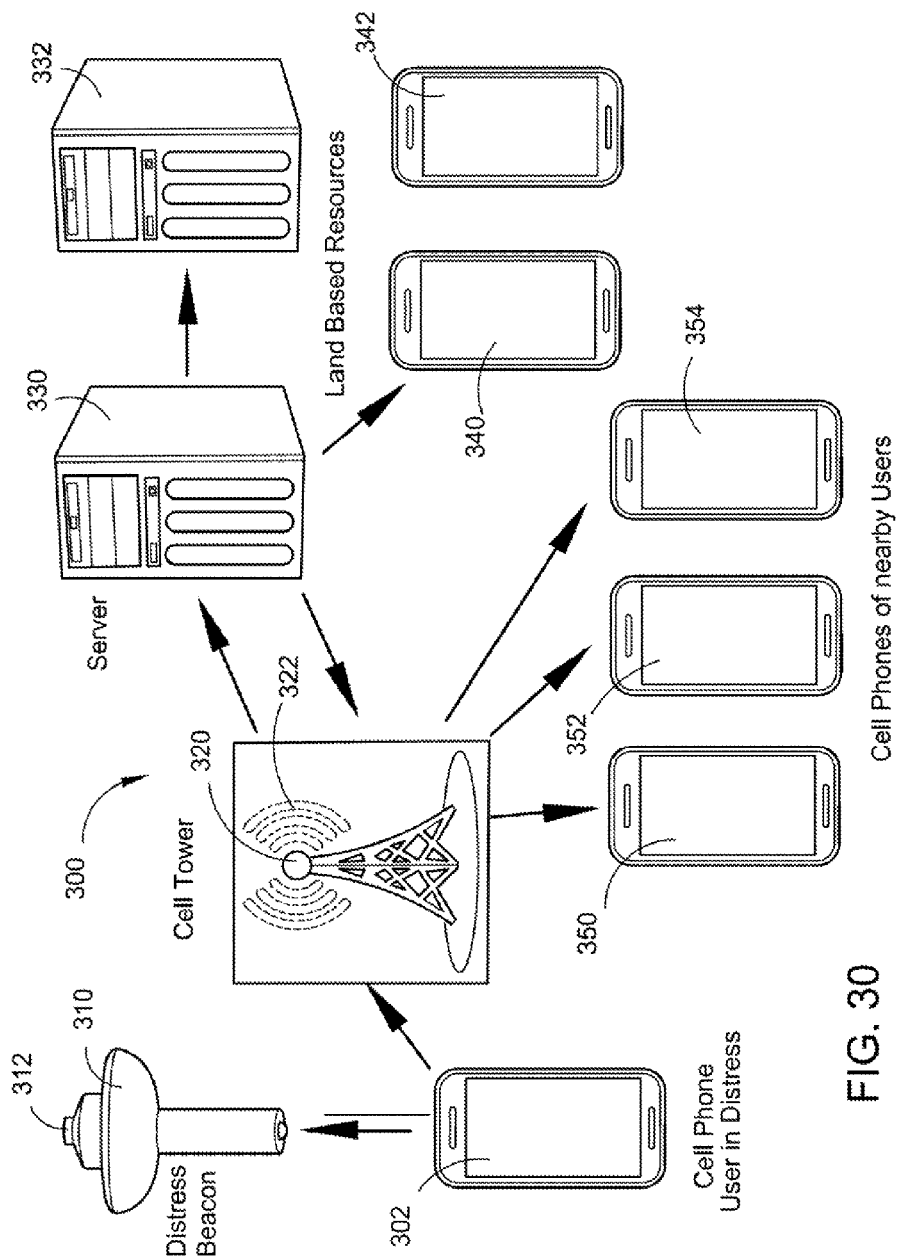
FIG. 30 depicts a chart of how the beacon communicates to a smartphone and thereby to land based resources and other nearby cell phones.

FIG. 30 depicts a chart of how the beacon communicates to a smartphone and thereby to land based resources and other nearby cell phones. The distress beacon housing 310 supports the light signal 312, but is also capable of communicating with a cell phone or smartphone 302 in an emergency situation. The cell phone 302 then sends a call or other information to cell tower 320 which passes that information on to the servers 330 and 332 which represent land based resources. These land based resources servers could then pass the information on to other cell phones 340 and 342. Or, the cell tower may send information directly to other cell phones of nearby users 350, 352 and 354 in the vicinity. The Come Quick application allows someone in distress to send an alert to others requesting assistance. Using a wireless connection, the application on the cell phone sends the GPS location to a land based server via a cell phone network and the internet. This server keeps track of the position of all of the users. When a user is in distress, they send an alert to the server which in turn sends the alert to other vessels in the area. It can also call a tow service, the Coast Guard or other resources specified by the user (see FIG. 30). The user fills out a plan for their voyage, the names and medical information for those passengers on board, the name and type of vessel, along with any other pertinent information such as the GPS locations of the intended positions and waypoints on the voyage.

Figure 31:
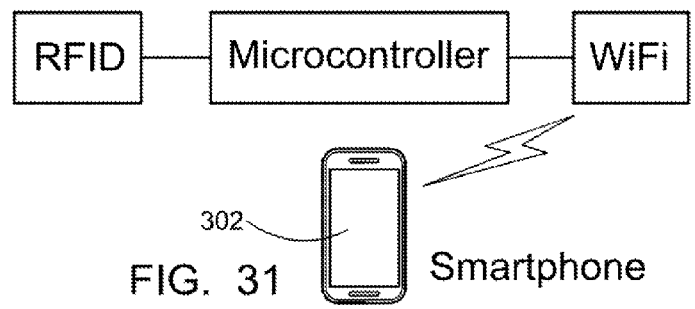
FIG. 31 depicts a "message in a bottle" function where information is downloaded to an active RFID card or other memory device on the beacon.

FIG. 31 depicts a "message in a bottle" function where information is downloaded to an active RFID card or other memory device on the beacon. This information can be downloaded to an active RFID card or on board memory on the beacon to provide a "Message in a Bottle" option. If the beacon were separated from the user, this information could be retrieved and would tell where the beacon came from. The alert message sent from the application to the network would contain the "Message in a Bottle" information. It would also contain the reason for the emergency. In this regard, the RFID card is connected to the microcontroller on the beacon, and sends information through a WiFi connection directly to the cell phone or smartphone 302.

Figure 32:
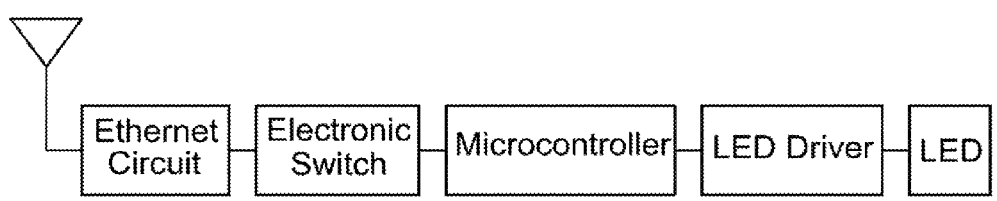
FIG. 32 depicts a chart illustrating how an Ethernet circuit can be employed to remotely control the LED driver on the beacon.

FIG. 32 depicts a chart illustrating how an Ethernet circuit can be employed to remotely control the LED driver on the beacon. An antenna picks up an Ethernet connection, sends control data through an electronic switch to a microcontroller which then activates the LED driver which controls the LED (on/off, flashing, colors, etc.). One such embodiment includes a smaller personal distress signal version ideal for travel aboard aircraft which might if transiting overwater separate from possible wreckage if plane was downed. Distress signal device would separate from wreckage at impact and float to surface aiding in locating survivors and debris. There would also be an option to send a signal to a wireless or Bluetooth module on the beacon. This provides a means of downloading the "message in a bottle" information to the beacon. This could also be used to remotely start the beacon. Also, a wireless rocker switch such as Cherry Switch's AFIS series can be used to activate the beacon or send a distress signal if the phone and/or the beacon were away from the user in an emergency. These switches require no batteries and harness the energy of the switch's motion. They could be placed in a key fob on a keychain and used without worry that the battery went dead.

Figure 33:
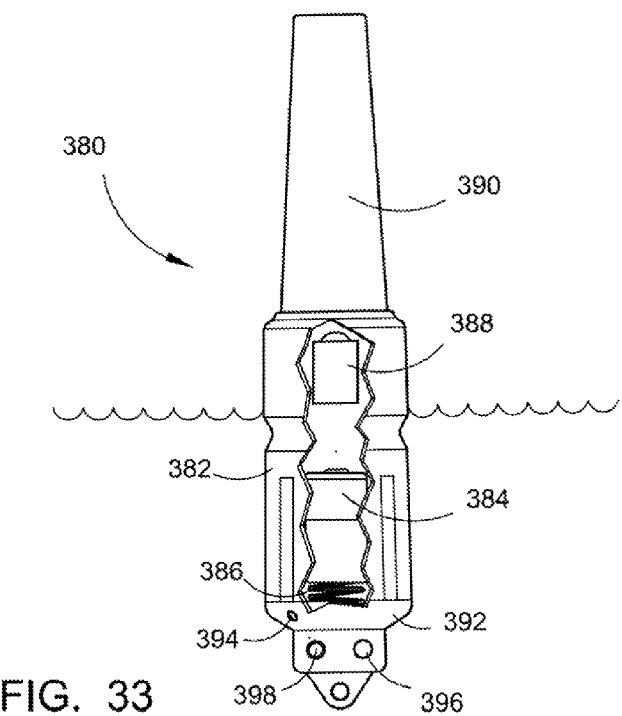
FIG. 33 depicts a miniaturized version of the beacon having water activation switch and an impact inertia switch.

FIG. 33 depicts a miniaturized version of the beacon having water activation switch and an impact inertia switch. This smaller beacon 380 is comprised of a floating housing 382 having an internal battery 384 or other power source supported by a battery spring 386, to power a light source 388. The light is directed outward through the lens 390 which when the smaller beacon unit 380 is floating in water, said lens 390 sticks up out of the water above the water line as shown here in FIG. 33. The smaller beacon unit 380 is also equipped with both a water activation switch 392 being activated when water pours though opening 394, and an impact inertia switch 396, as well as a conventional mechanical manual on/off switch 398. This embodiment including a smaller personal distress signal 380 is ideal for travelers aboard aircraft which might if transiting overwater separate from possible wreckage if plane made a water landing or was downed. The distress signal device 380 would separate from the wreckage at impact and float to surface aiding in locating survivors and debris. The beacon light would turn on in the event of water activation or impact activation, or could be manually switched on, in any emergency situation.

Figure 34:
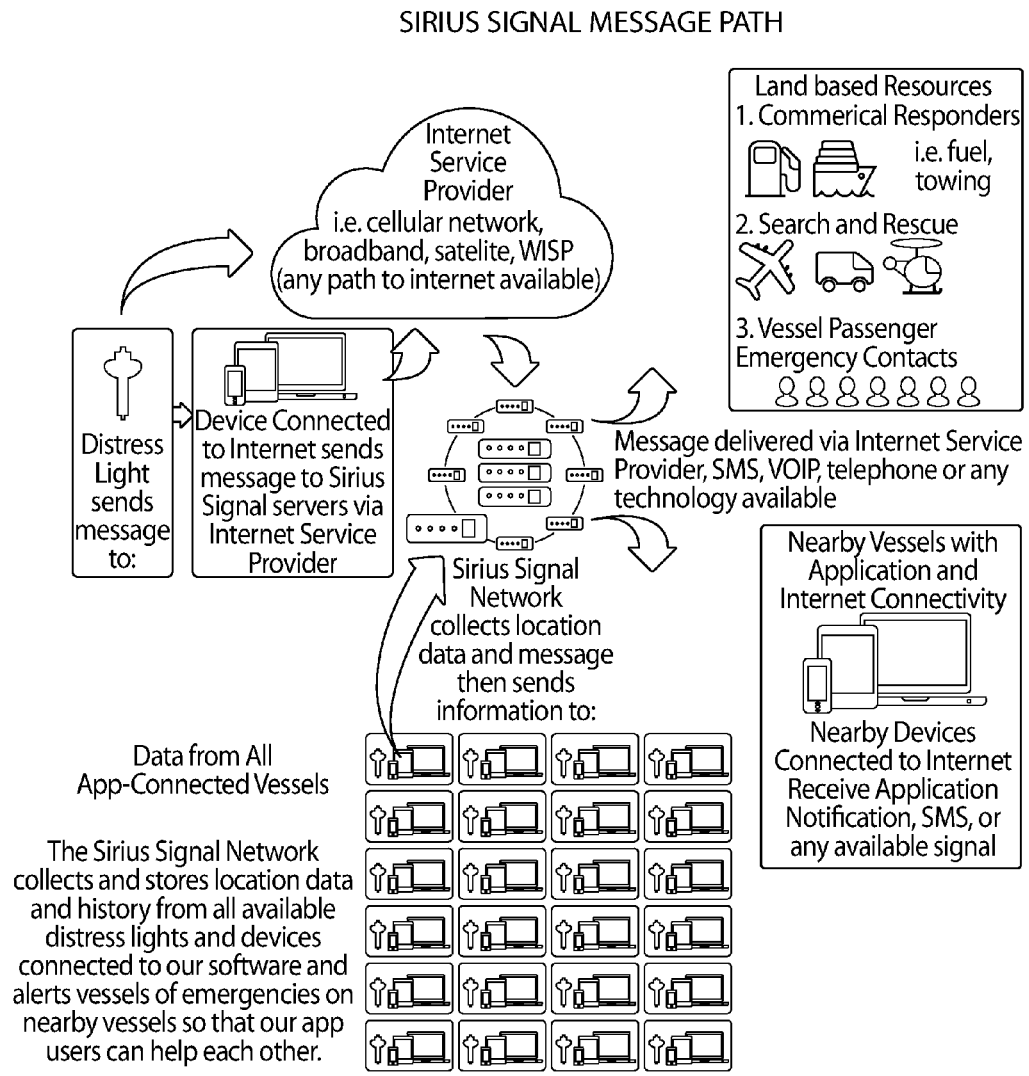
FIG. 34 depicts a detailed chart illustrating the message path taken by the beacon to alert distress to land based resources and nearby vessels with Internet connectivity.

FIG. 34 depicts a detailed chart illustrating the message path taken by the beacon to alert distress to land based resources and nearby vessels with Internet connectivity. The basic function of the Come Quick Distress mobile application is to provide a means of requesting assistance in an emergency. Since most people have a cell phone, and in most cases a smartphone today, this application works on cell phones and smartphones.

FIG. 35 depicts several screen shots of a mobile application for communication between the beacon and smartphones having a home level and two first levels, a second level and a third level. There are two different home screens; one for motor vessels and one for sailing vessels. There are menus for providing the vessel profile, and the coordinates for the location of the present voyage.

Figure 36:
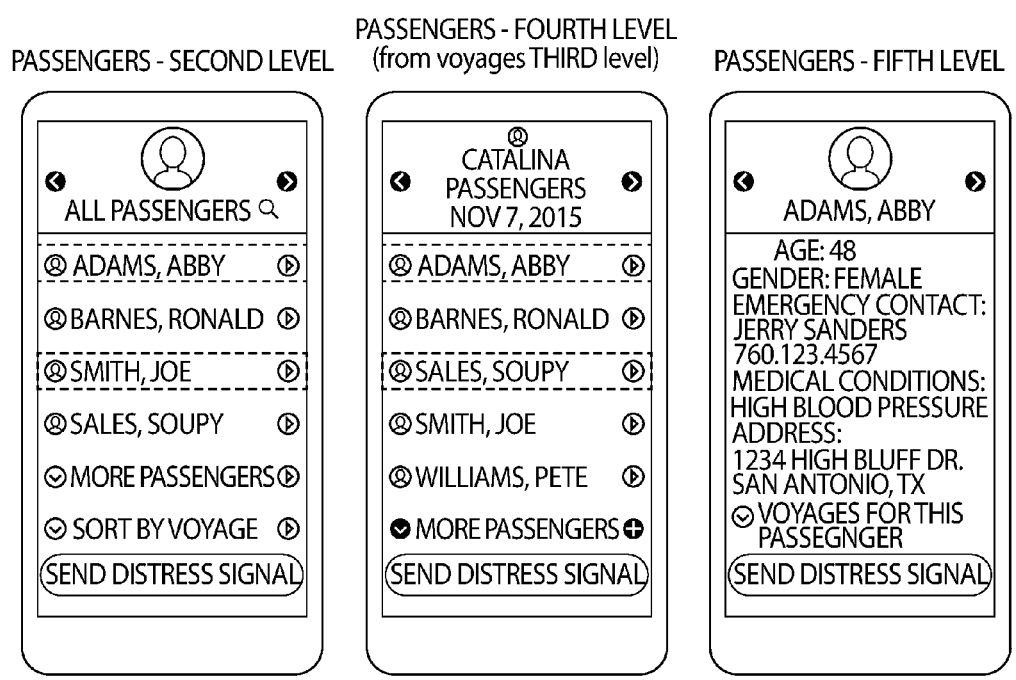
FIG. 36 depicts a several screen shots of a mobile application for communication between the beacon and smartphones having a second level, a fourth level and a fifth level.

FIG. 36 depicts a several screen shots of a mobile application for communication between the beacon and smartphones having a second level, a fourth level and a fifth level. There are also menus for describing the passengers on-board, including medical information. To avoid issues stemming from not knowing the menu system, and to accommodate a panicked person in an emergency situation, all menus have a SEND DISTRESS SIGNAL button allowing for immediate navigation to a distress signal menu. From this menu, the user can download the voyage information to the emergency beacon (this is described above as the "message in a bottle" function). If the beacon were separated from the vessel, it would have the pertinent information available to anyone who might recover it. There is also a menu allowing the user to describe the nature of the distress so that the information can be included in the distress signal message and in the "message in a bottle" information. Additionally, there is a button to remotely activate the beacon and thereby control the functionality of the beacon. Weather information would also be available from this menu.

FIG. 37 depicts a screen shot of the web-based application accessed via the beacon mobile application, illustrating the home level for the dashboard page. Also, another embodiment would use a server to keep track of cell phones using this application that were in range of a cell communications tower. If a user presses the SEND DISTRESS SIGNAL button, the cell phone uses an internet connection to send a distress signal to the server. The server would look for other users that were close to the location of the user that sent the distress signal. The server would then send an alert to those users containing the voyage information. The alert can be in the form of a phone call or an alert message sent through the mobile application. The server can also send alerts to the Coast Guard or equivalent agency, a towing or vessel assist service, search and rescue (SAR) personnel, emergency medical systems (EMS) personnel, the cloud, the Rescue Coordination Center, and/or other land-based resources as necessary.

Figure 38:
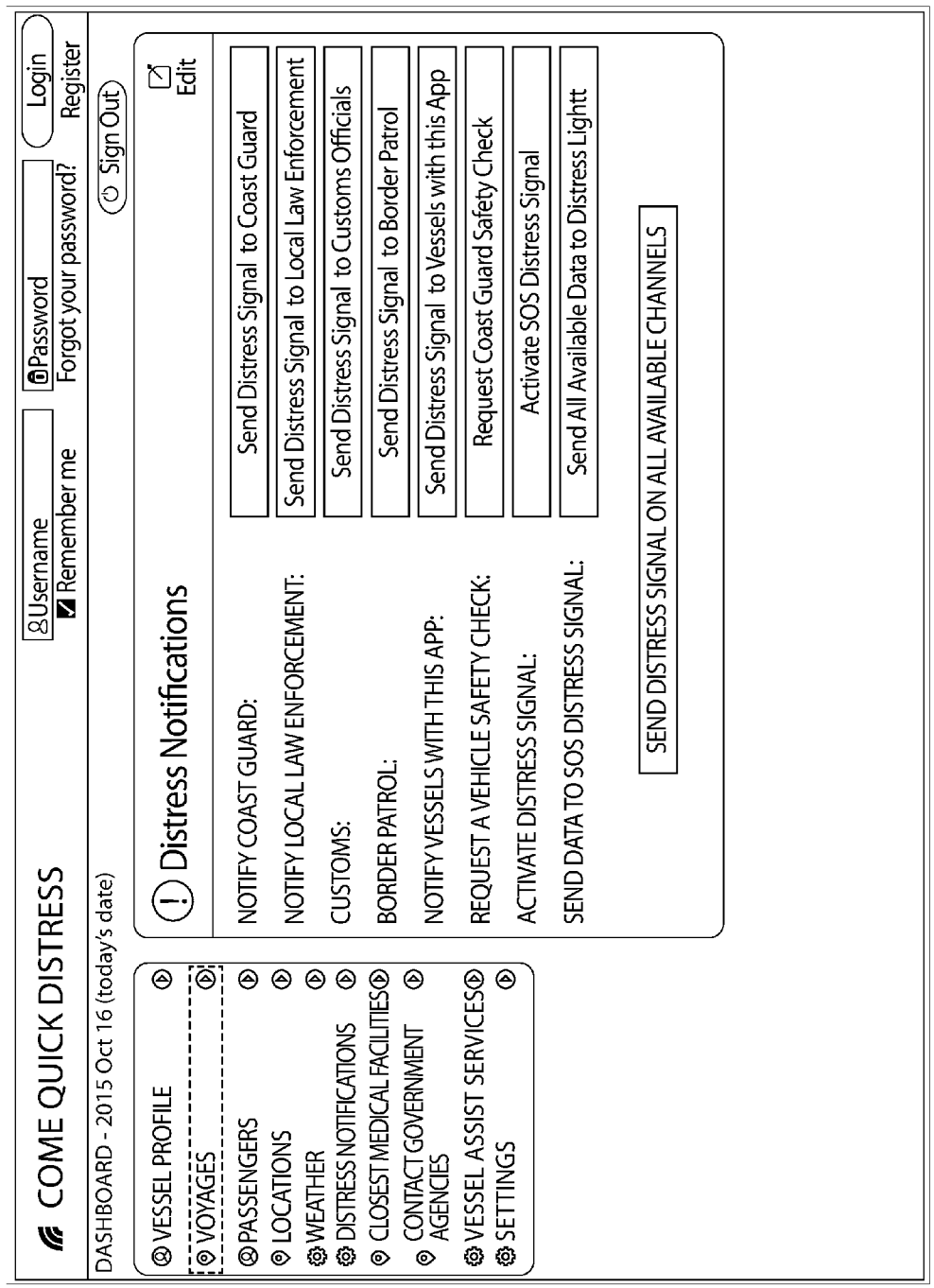
FIG. 38 depicts a screen shot of the web-based application accessed via the beacon mobile application, illustrating the distress notifications control page.

FIG. 38 depicts a screen shot of the web-based application accessed via the beacon mobile application, illustrating the distress notifications control page.

FIG. 39 depicts a screen shot of the web-based application accessed via the beacon mobile application, illustrating the vessel profile page.

FIG. 40 depicts a screen shot of the web-based application accessed via the beacon mobile application, illustrating the current distress notifications page.

Figure 41:
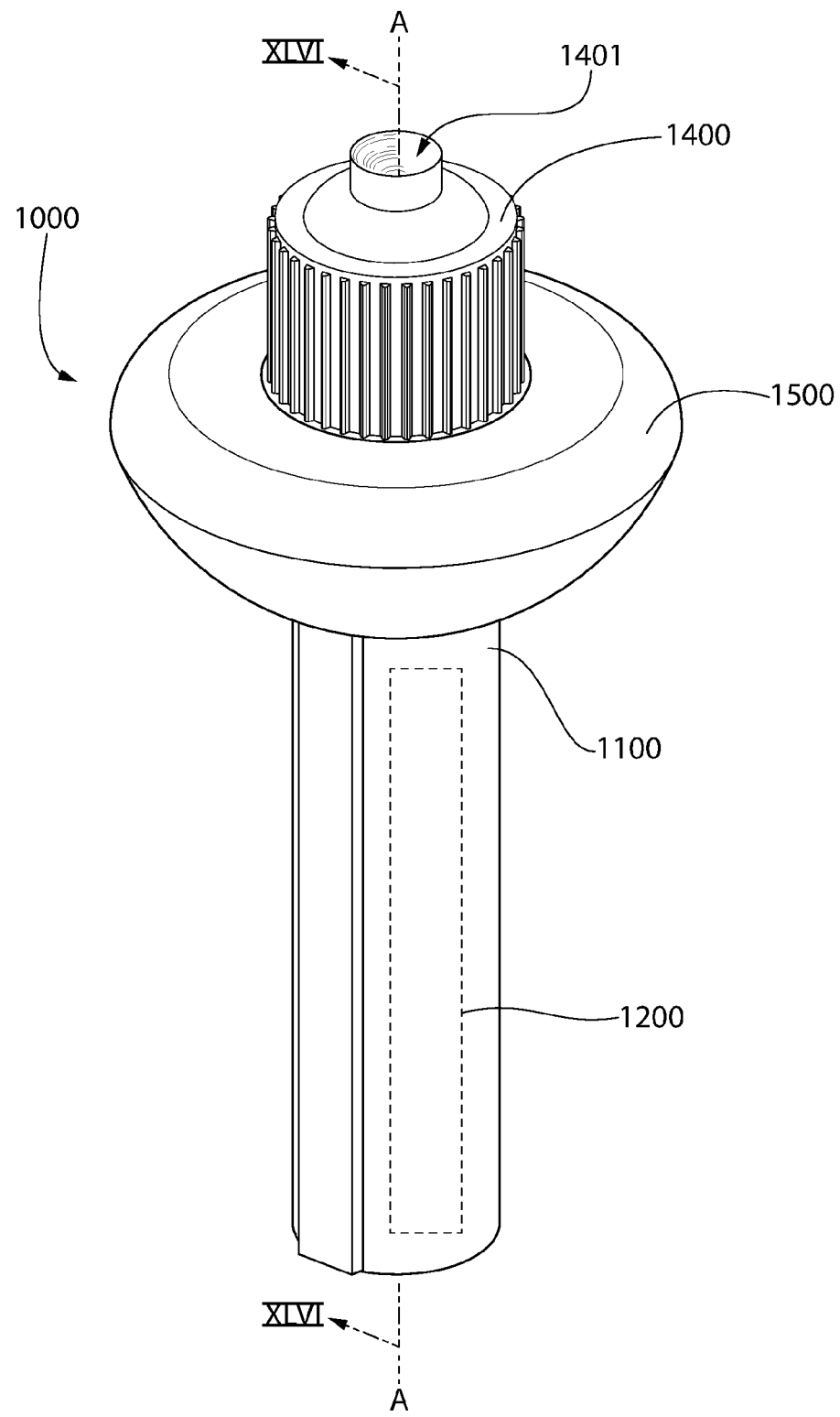
FIG. 41 is a perspective view of a visual distress signal device in accordance with an alternative embodiment of the present invention.
Figure 42:
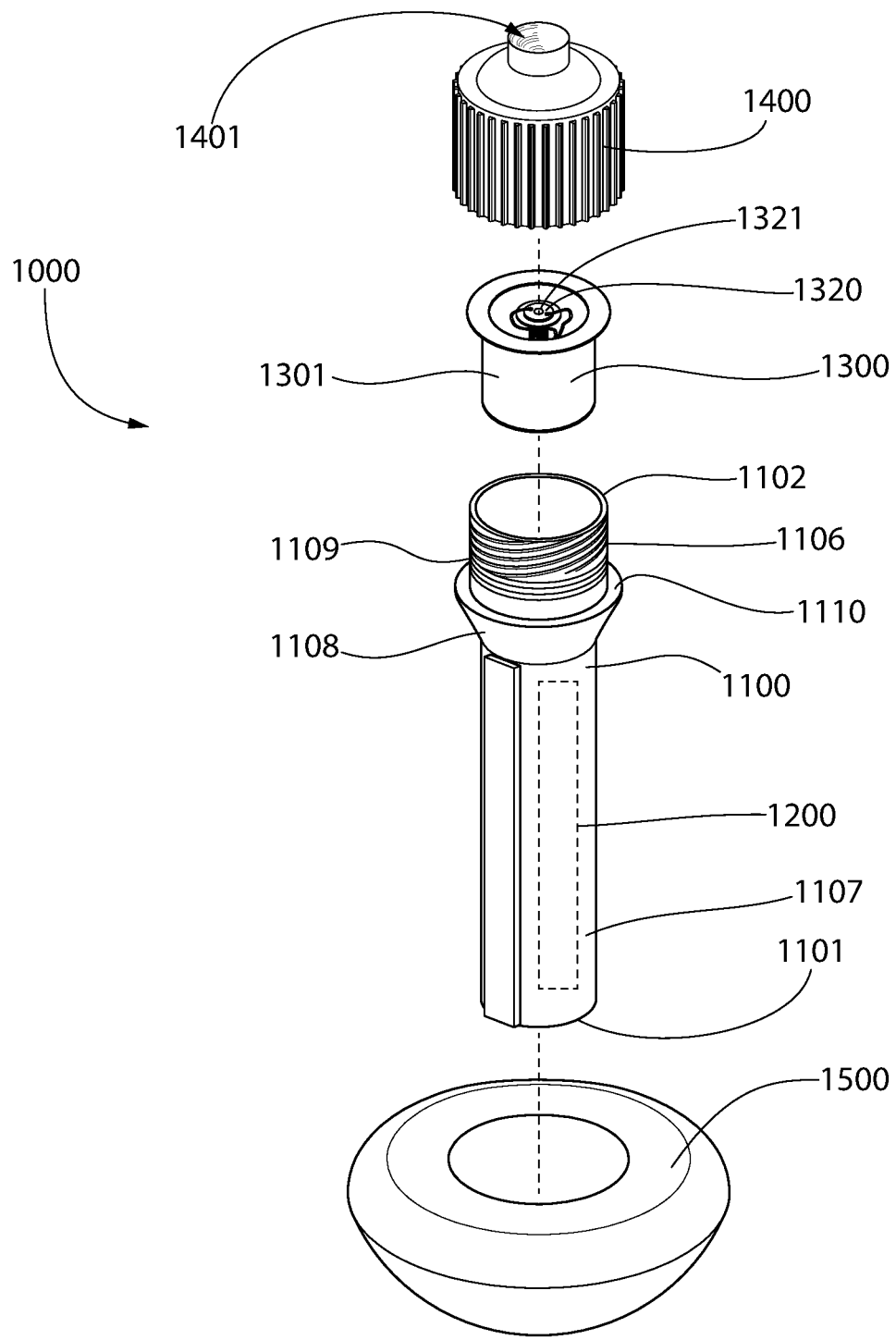
FIG. 42 is an exploded view of the visual distress signal device of FIG. 41 illustrating a main housing, an electronic assembly, a lens member, and a float member.

Referring to FIGS. 41 and 42 concurrently, a visual distress signal device 1000 (hereinafter "device 1000) will be described in accordance with an alternative embodiment of the present invention. The device 1000 is illustrated in a fully assembled state in FIG. 41 and in an exploded state in FIG. 42. The device 1000 generally comprises a housing 1100, a power source 1200 (illustrated schematically as a broken-line rectangle) disposed within the housing 1100, an electronic assembly 1300 at least partially positioned within the housing 1100, a lens member 1400 that is detachably coupled to the housing 1100, and a float member 1500 that is detachably coupled to the housing 1100. The structure of these components will be described in more detail below as well as the manner in which these components interact and function together.

Figure 46:
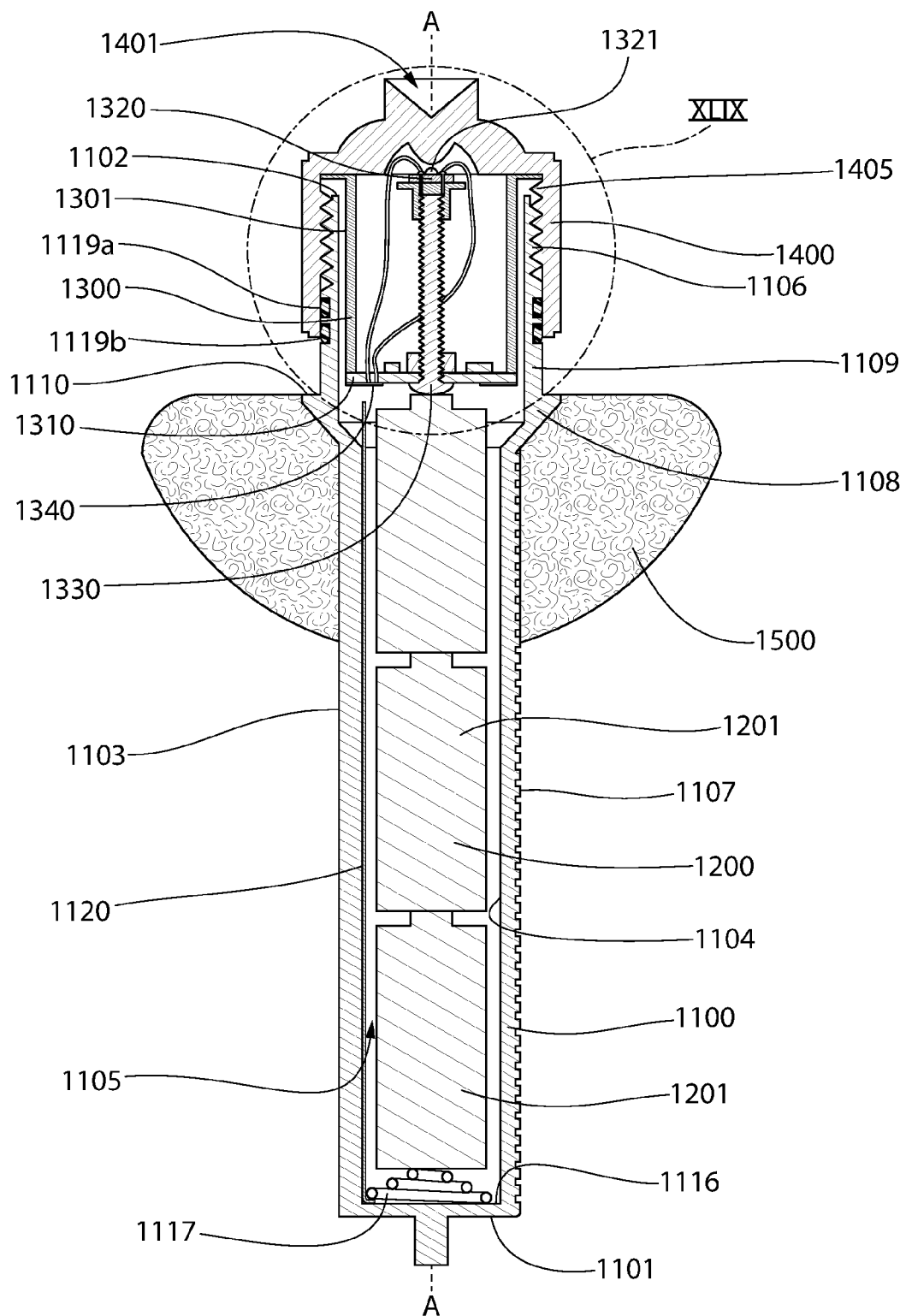
FIG. 46 is a cross-sectional view taken along line XLVI-XLVI of FIG. 41 with a light source of the electronic assembly in an off state.

Referring to FIGS. 41, 42, and 46 concurrently, the device 1000 and its components will be described in more detail. The housing 1100 extends along a longitudinal axis A-A from a closed bottom end 1101 to an open top end 1102. The housing 1100 has an outer surface 1103 and an inner surface 1104 that defines an internal cavity 1105. The open top end 1102 provides a passageway into the internal cavity 1105 so that components, such as the power source 1200 and the electronic assembly 1300 may be inserted into the internal cavity 1105 of the housing 1100. The internal cavity 1105 extends the entire length of the housing 1100 from a floor 1116 of the internal cavity 1105 to the top end 1102 of the housing 1100. In the exemplified embodiment the housing 1100 is formed of a rigid plastic material, although other materials are possible and within the scope of this invention. It is preferred that the housing 1100 be formed of a material that is impenetrable by liquid so that the internal cavity 1105 remains free of liquid even when the device 1000 is floating on or positioned within a liquid (so long as the open top end 1102 is closed and sealed in a watertight manner as described below).

The housing 1100 comprises a handle portion 1107, a flange portion 1108, and a top portion 1109. The handle portion 1107 has a constant diameter. The flange portion 1108 has a continuously increasing diameter in the direction heading from the handle portion 1108 towards the top portion 1109. The flange portion 1108 terminates in a ledge or shoulder 1110 and its tapered shape prevents the float member 1500 from being separated from the housing 1100 when the device 1000 is placed in water as discussed in more detail below. The top portion 1109 comprises a first connection feature 1106 that facilitates coupling of the lens member 1400 to the housing 1100 as described in more detail below. In the exemplified embodiment the first connection feature 1106 comprises threads (similar to standard threads on a bottle that mate with threads on a bottle cap).

In the exemplified embodiment, two gaskets 1119a, 1119b, exemplified as O-rings in the illustrated embodiment, are coupled to the top portion 1109 of the housing 1100 between the first connection feature (i.e., threads) 1106 and the ledge/shoulder 1110 of the flange portion 1108 of the housing 1100. The gaskets 1119a, 1119b facilitate ensuring a liquid or watertight seal is formed between the lens member 1400 and the housing 1100 when the lens member 1400 is coupled to the housing 1100 as described in more detail below. This ensures that water or other liquid does not enter into the internal cavity 1105 when the lens member 1400 is coupled to the housing 1100 thereby protecting the electronic components of the device 1000 even in a wet environment (the device 1000 is intended for use in marine environments in some embodiment's so maintaining this watertight seal is important).

A first electrical contact 1120 is positioned within the internal cavity 1105 of the housing 1100. In the exemplified embodiment, the first electrical contact 1120 is secured to the inner surface 1104 of the housing 1100. The first electrical contact 1120 may be an elongated metal strip that extends along the length of the internal cavity 1105, although other iterations and permutations are possible in alternative embodiments. The first electrical contact 1120 is operably coupled to the power source 1200 as discussed in more detail below and is also involved in closing the electrical circuit loop between all of the electronic components (it operates as a part of a switch mechanism). The first electrical contact 1120 facilitates activation of an illumination device or light source as will be described in more detail below.

The power source 1200 is positioned within the internal cavity 1105 of the housing 1100. In the exemplified embodiment, the power source 1200 comprises a plurality of batteries 1201, and more specifically three C batteries. Of course, the invention is not to be so limited in all embodiments and the power source 1200 may be batteries other than C batteries, the power source 1200 may include more or less than three batteries, or the power source may take on a form different than being batteries (including solar power or the like).

A spring 1117 is positioned at the floor 1116 of the internal cavity 1105. In the exemplified embodiment, the spring 1117 is a compression spring although the invention is not to be so limited in all embodiments. The spring 1117 is a metal spring and it is in direct physical contact with the first electrical contact 1120. The batteries 1201 are positioned within the internal cavity 1105 so that a bottom-most one of the batteries 1201 is in direct contact with the spring 1117. Thus, the batteries 1201 are operably electrically coupled to the first electrical contact 1120 and the spring 1117 forms a part of the electrical circuit that transmits power from the power source 1200 to the light source. The spring 1117 permits the batteries 1201 to move axially along the longitudinal axis A-A within the internal cavity 1105. Specifically, downward pressure applied to the batteries 1201 will cause the batteries 1201 to move axially downward towards the floor 1116 of the internal cavity 1105 as long as the downward pressure exceeds the spring force.

Although the specific structural details of the electronic assembly 1300 will be described in more detail below with reference to FIGS. 43-45, it will be briefly described now with continued reference to FIGS. 41, 42, and 46. The electronic assembly 1300 comprises a tubular body 1301, a first circuit assembly 1310, a second circuit assembly 1320, a second electronic contact 1330, and a third electrical contact 1340. In the exemplified embodiment, the second circuit assembly 1320 comprises a light source (or illumination device) 1321. In the exemplified embodiment, the light source 1321 is or consists entirely of a single light emitting diode (LED), although the invention is not to be so limited in all embodiments. Thus, in the exemplified embodiment a single LED, in cooperation with the lens member 1400, are capable of emitting both the 360 degree horizontal light pattern and the vertical light pattern (discussed above with reference to FIGS. 6 and 7 and also briefly below) simultaneously.

Figure 48:
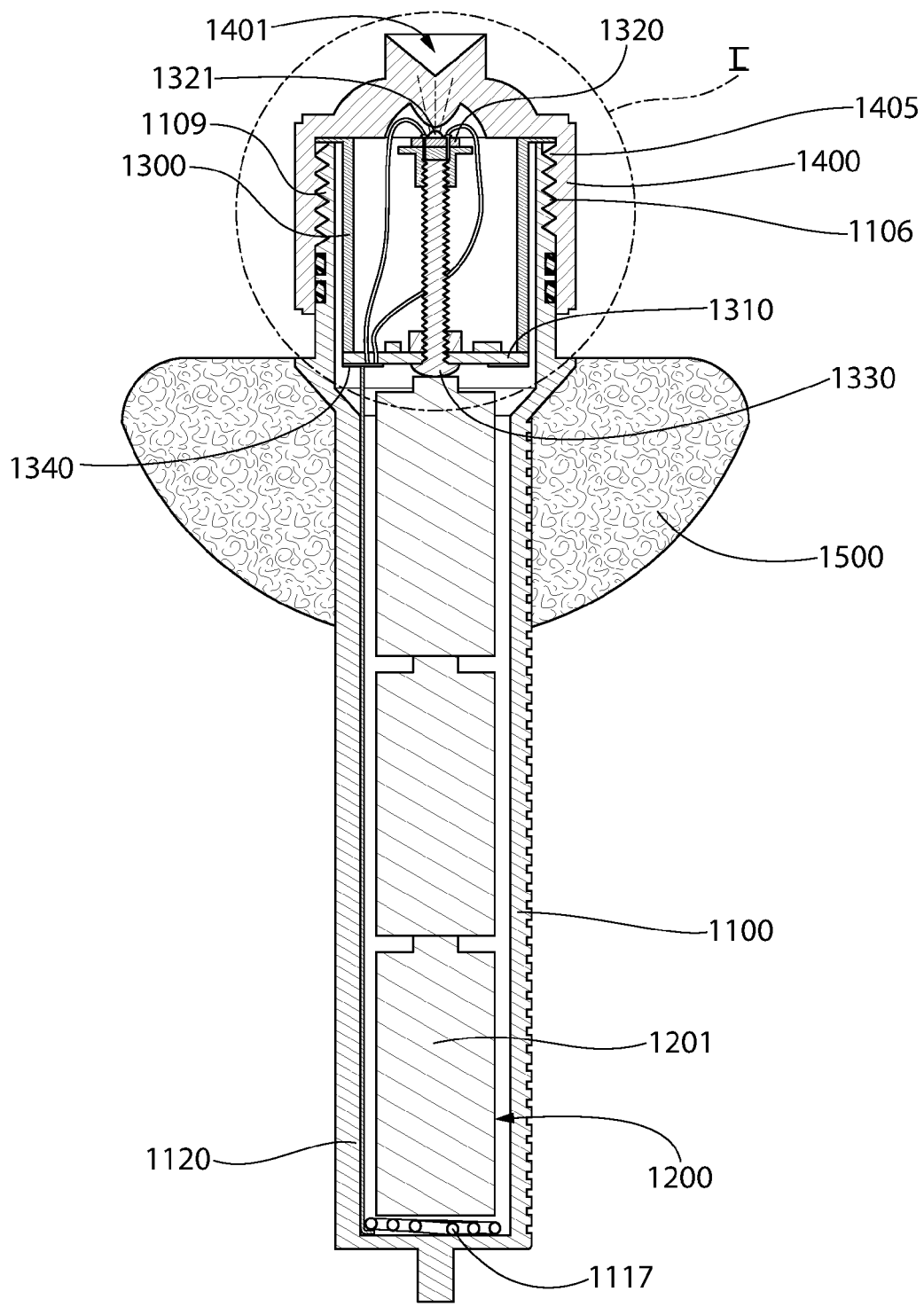
FIG. 48 is a cross-sectional view taken along line XLVI-XLVI of FIG. 41 with a light source of the electronic assembly in an on state.
Figure 49:
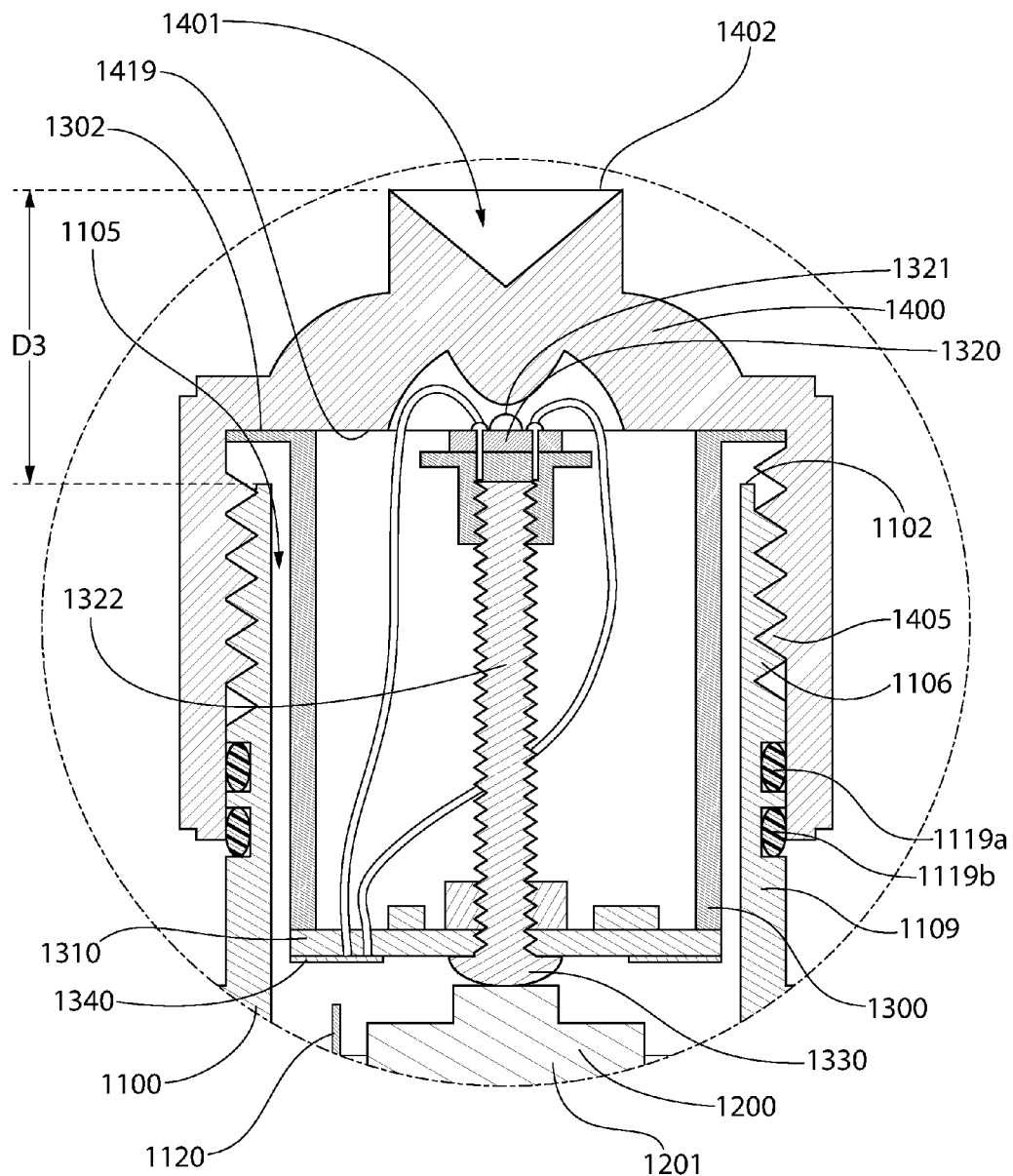
FIG. 49 is a close-up view of area XLIX of FIG. 46.
Figure 50:
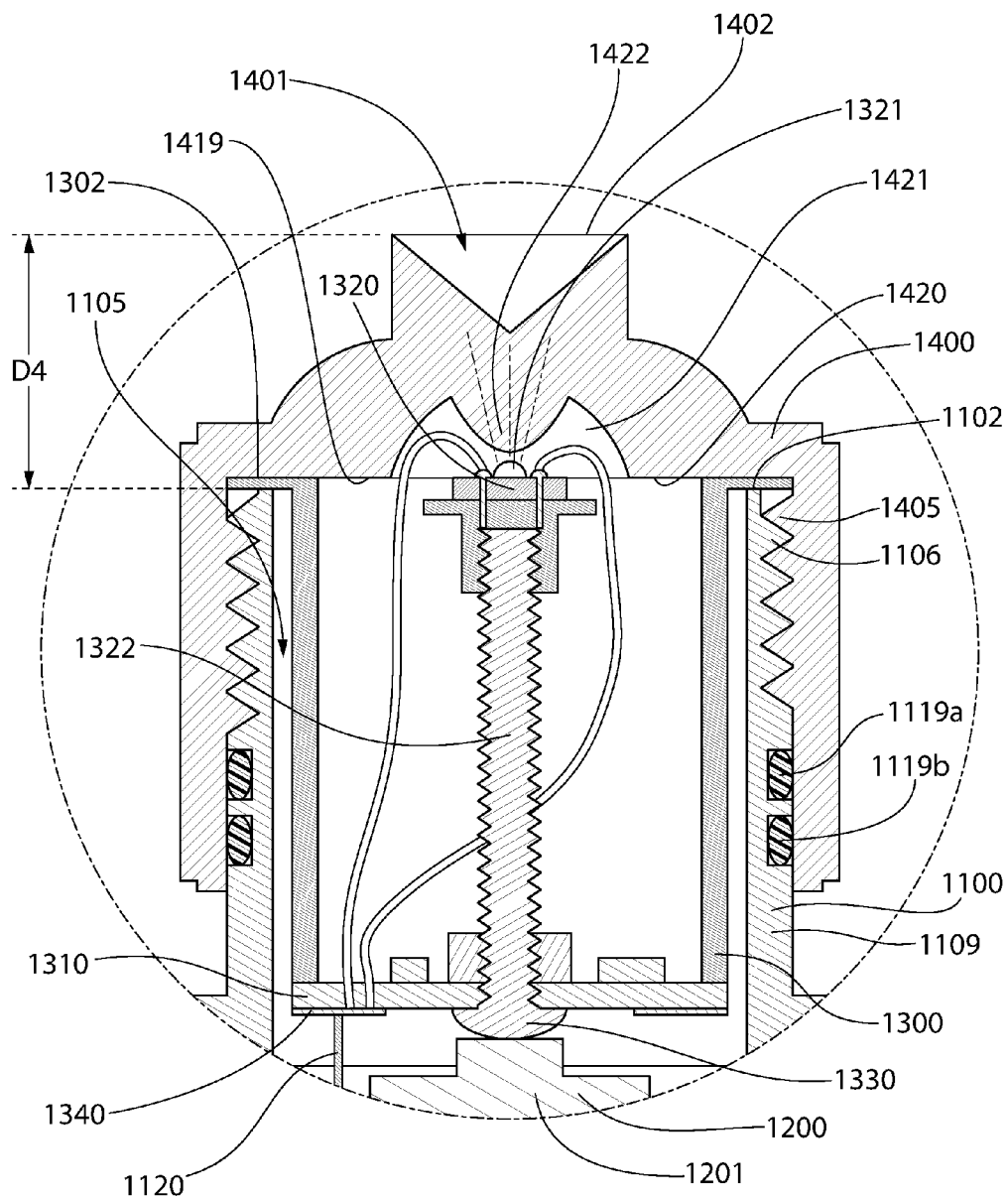
FIG. 50 is a close-up view of area L of FIG. 48.

In the assembled device 1000, the tubular body 1301 of the electronic assembly 1300 is at least partially positioned within the internal cavity 1105 of the housing 1100. The term partially is used because a portion of the electronic assembly 1300 may protrude from the internal cavity 1105 and thus may not be considered to be disposed therein. The second electrical contact 1330 is electrically coupled to the power source 1200 (via direct contact between the second electrical contact 1330 and the uppermost one of the batteries 1201). The third electrical contact 1340 may be altered between being in contact with the first electrical contact 1120 (which closes a switch and forms a fully closed circuit to facilitate activation of the light source 1321 as shown in FIGS. 48 and 50) and not being in contact with the first electrical contact 1120 (as shown in FIGS. 46 and 49). This feature will be discussed in more detail below with specific reference to FIGS. 49 and 50.

The lens member 1400 is a transparent plastic component that facilitates refraction/dispersion of the light emitted from the light source 1321. The details of the lens member 1400 are similar to that shown in FIGS. 6 and 7 and described above and the description above may be applicable to this embodiment. The lens member 1400 is configured to refract the light emitted from the light source 1321 in at least two patterns including a 360 degree horizontal pattern that is transverse to the longitudinal axis A-A of the housing 1100 and a vertical pattern that extends upwardly from the top of the lens member 1400 vertically in the direction of the longitudinal axis A-A of the housing 1100. The lens member 1400 has a conical reflective cavity 1401 that facilitates the desired transmission of the light patterns. The lens member 1400 has a second connection feature 1405, which in the exemplified embodiment are internal threads that engagingly mate with the first connection feature 1106 (i.e., the threads) of the housing 1100 to couple the lens member 1400 to the housing 1100. In the exemplified embodiment the first connection feature 1106 are external threads and the second connection feature 1405 are internal threads, but this may be flipped in other embodiments. Furthermore, connection features other than threads may be used in other embodiments, including snap-fit, tight-fit, interference fit, sliding interaction, lock-and-key, cooperating indent/detent, or the like.

The float member 1500 is a member that permits the device 1000 to float when placed in a liquid such as water. Specifically, the float member 1500 may be made of any material that is designed to float in liquid (and specifically water or salt water). In certain embodiments, the float member 1500 is formed of foam. More specifically, the float member 1500 may be formed of a compressible foam material, preferably a closed-cell foam material. The float member 1500 is sufficiently buoyant that it is capable of maintaining at least an upper portion of the device 1100 above the surface of the liquid within which it is floating, as described above with specific reference to FIG. 33. In certain embodiments the portion of the housing 1100 holding the power source 1200 (i.e., batteries 1201) may be beneath the surface of the liquid and the electronic assembly 1300 may be above the surface of the liquid. The weight of the batteries 1201 will ensure that the device 1000 remains upright when it is floating in the liquid. Furthermore, as noted above the device 1000 has a sealed in a watertight manner so that no water may enter into the internal cavity 1105 of the housing 1100.

Figure 47:
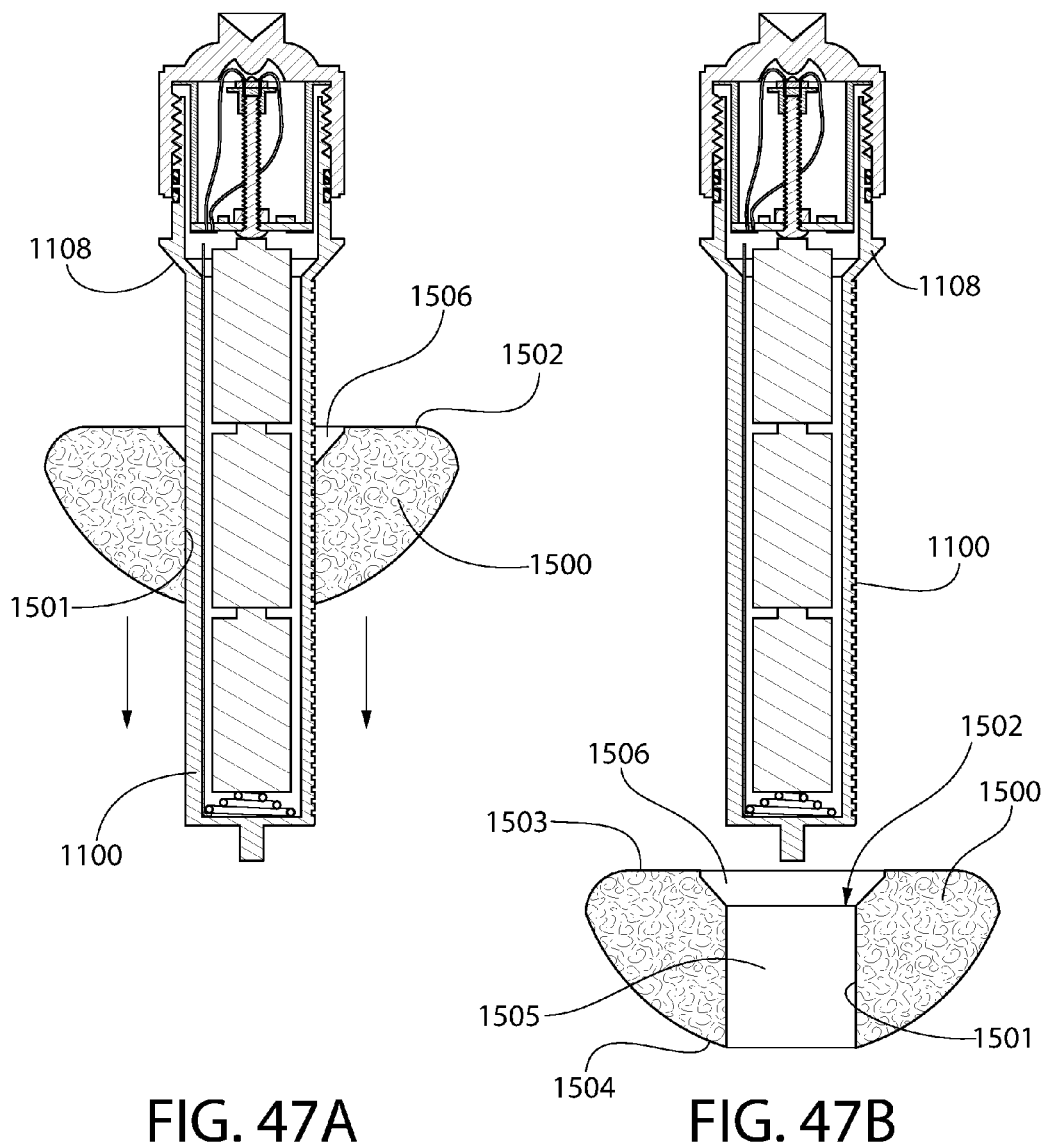
FIGS. 47A and 47B are cross-sectional schematic views of the visual distress signal device of FIG. 41 illustrating the removability of the float member from the main housing.

Referring to FIGS. 47A and 47B, the detachable manner in which the float member 1500 is coupled to the housing 1100 will be described. The float member 1500 has an inner surface 1501 that defines a passageway 1502 through the float member 1500 from an upper surface 1503 of the float member 1500 to a lower surface 1504 of the float member 1500. The passageway 1502 has a first section 1505 with a constant cross-sectional area and a second section 1506 with a tapered cross-sectional area that matches with the cross-sectional area of the flange portion 1108 of the housing 1100. The float member 1500 is coupled to the housing 1100 by inserting the handle portion 1107 of the housing 1100 into the passageway 1502 and continuing to axially move the housing 1100 and the float member 1500 relative to one another until the flange portion 1108 of the housing 1100 is positioned within the second portion 1506 of the passageway 1502. At this position, the float member 1500 can not be axially moved upward any further due to the interaction between the flange portion 1108 of the housing 1100 and the inner surface 1501 of the float member 1500 defining the second portion 1506 of the passageway 1502.

Separating or detaching the float member 1500 from the housing 1100 requires a user to pull the float member 1500 down along the body of the housing 1100. However, the float member 1500 will not easily become detached from the housing 1100 when the device 1000 is floating in water because the weight of the housing 1100 with the batteries 1201 therein will pull the housing 1100 in a downward direction relative to the float member 1500, which prevents the float member 1500 from being pulled downwardly relative to the housing 1100. Thus, although the float member 1500 is rather easily attached to and detached from the housing 1100 (for cleaning, replacement, or any other desired purpose), the float member 1500 will not easily become detached from the housing 1100 during normal use with the device 1000 floating in a liquid such as water.

Figure 43:
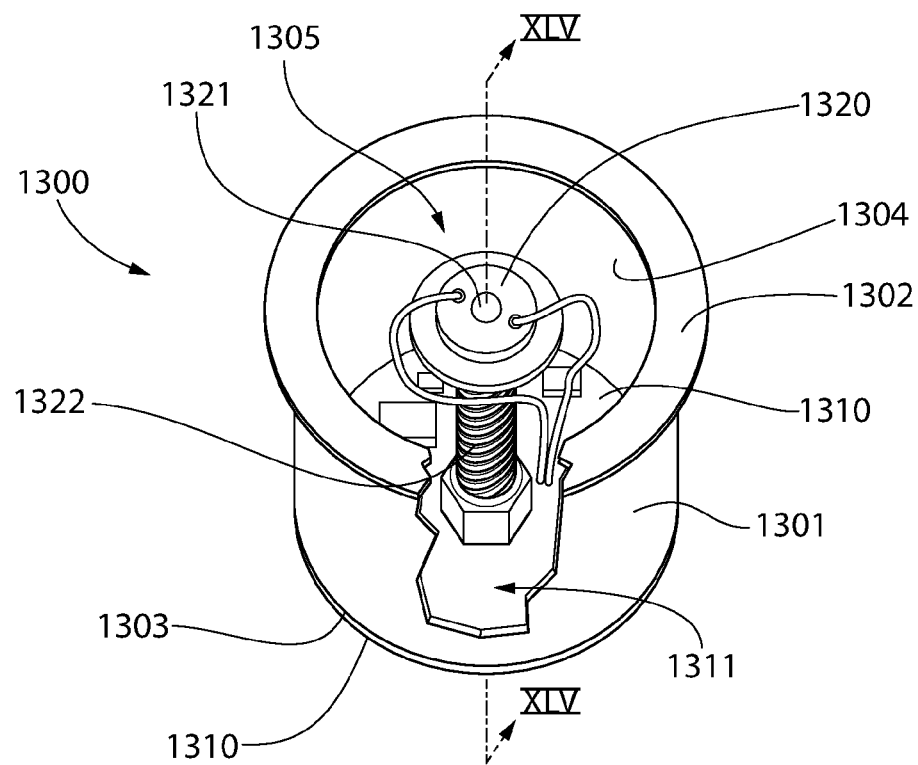
FIG. 43 is a partially broken away perspective view of the electronic assembly of the visual distress signal device of FIG. 41.
Figure 44:
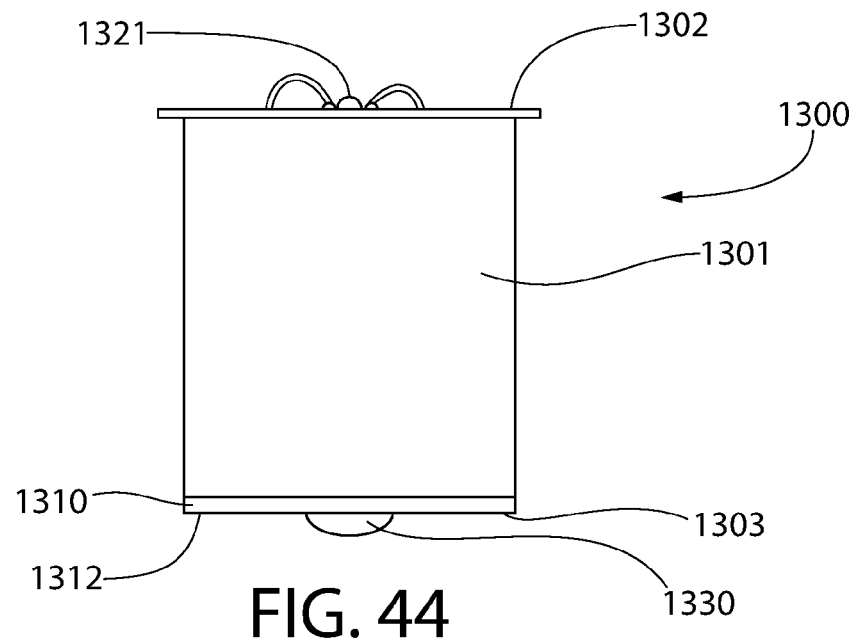
FIG. 44 is a side view of the electronic assembly of FIG. 43.
Figure 45:
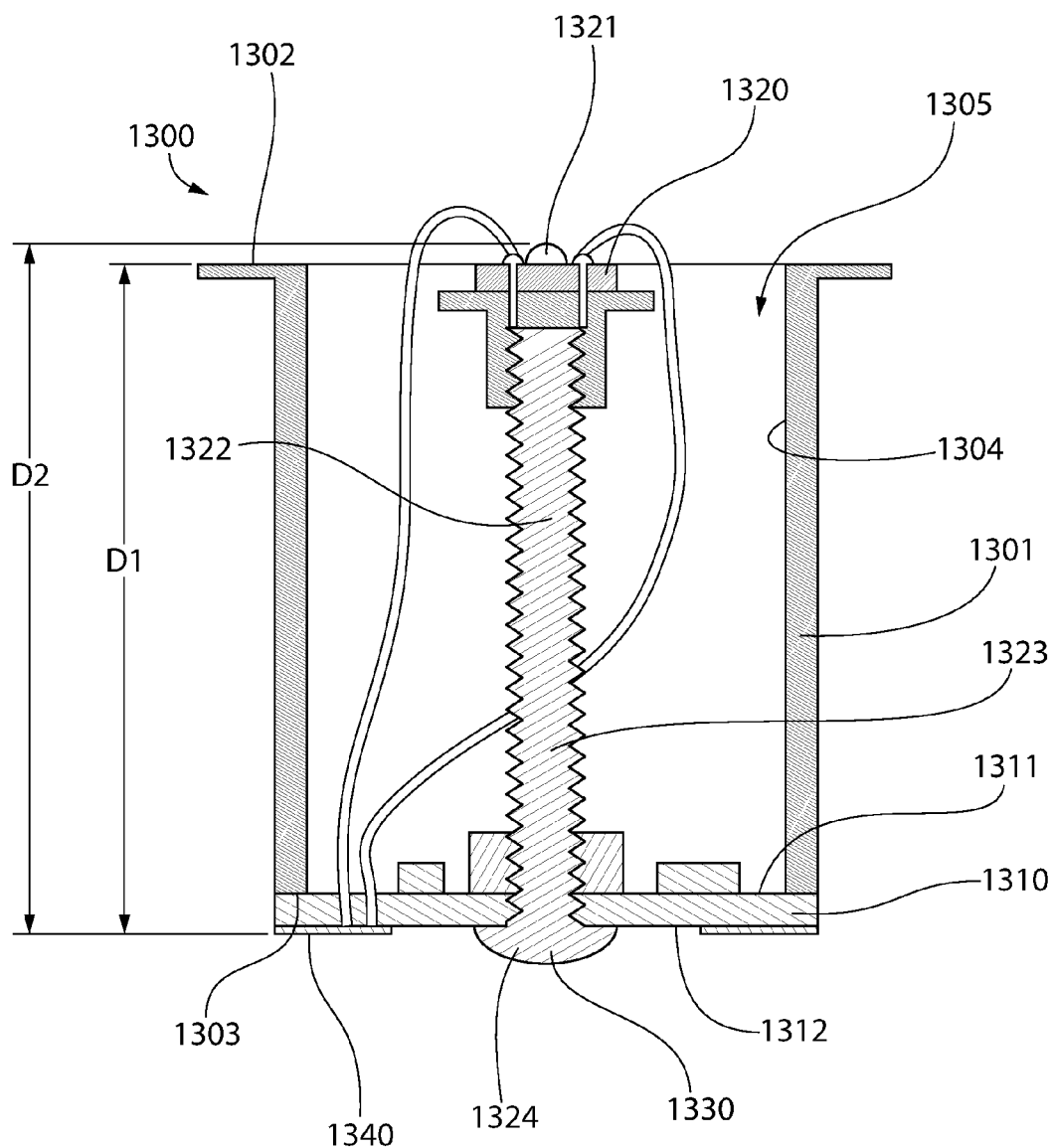
FIG. 45 is a cross-sectional view taken along line XLV-XLV of FIG. 43.

Referring now to FIGS. 43-45, the electronic assembly 1300 will be further described. As noted above, the electronic assembly 1300 comprises the tubular body 1301, the first circuit assembly 1310, the second circuit assembly 1320, the second electronic contact 1330, and the third electrical contact 1340. The tubular body 1301 comprises a top edge 1302 that surrounds an open top end of the tubular body 1301 and a bottom edge 1303 that surrounds an open bottom end of the tubular body 1301. The tubular body 1301 is essentially a cylindrical body having openings on both of its opposing ends. Although described herein as being tubular and ring-shaped, the invention is not to be so limited in all embodiments and the body 1301 may take on other shapes in other embodiments.

The first circuit assembly 1310 may comprise a microprocessor that controls the pattern of operation of the light source 1321 of the second circuit assembly 1320. Specifically, when the electric circuit is closed such that the light source 1321 is activated, the microprocessor of the first circuit assembly 1310 may control the flashing or blinking sequence of the light source 1321. In some embodiments the microprocessor may ensure that the flashing sequence of the light emitted by the light source 1321 is that of an SOS signal or pattern. In some embodiments, the light source 1321 when activated may emit light exclusively in an SOS signal or pattern such that the SOS signal or pattern is the only manner in which the light is emitted. In such embodiments the device 1000 can not be used as a constant or continuous non-blinking/flashing source of light, but rather the light will only be emitted in a blinking pattern that is representative of the visual SOS light signal. This is described more fully above.

In the exemplified embodiment, the first circuit assembly 1310 is coupled to the bottom edge 1301 of the tubular body 1301. In the exemplified embodiment, this coupling is achieved by glue, but other adhesives or fastener devices may be used in other embodiments. As a result, the first circuit assembly 1310 forms a floor of the electronic assembly 1300. More specifically, the first circuit assembly 1310 comprises a first surface (or upper surface) 1311 that forms the floor of the interior cavity of the electronic assembly 1300 and a second surface (or lower surface) 1312 that forms a bottom surface of the electronic assembly 1300. Collectively, an inner surface 1304 of the tubular body 1301 and the first surface 1311 of the first circuit assembly 1310 define a cavity 1305 of the electronic assembly 1300.

The second circuit assembly 1320 is spaced from the floor of the electronic assembly 1300 (and from the first circuit assembly 1310). More specifically, the second circuit assembly 1320 is suspended within the cavity 1305 of the electronic assembly 1300 above the first circuit assembly 1310. Still more specifically, the second circuit assembly 1320 is positioned atop a pedestal 1322 to suspend the second circuit assembly 1320 within a cavity of the electronic assembly 1300.

The pedestal 1322 comprises a first portion 1323 that protrudes from the first surface 1311 of the first circuit assembly 1310 and into the cavity 1305 and a second portion 1324 that protrudes from the second surface 1312 of the first circuit assembly 1310 (and from the bottom surface of the electronic assembly 1300). The first portion 1323 of the pedestal 1322 supports the second circuit assembly 1320 above the floor and within the cavity 1305. The second portion 1324 of the pedestal 1322 forms the second electrical contact 1330 of the electronic assembly 1300. In order for the second portion 1324 of the pedestal 1322 to form the second electrical contact 1330, the pedestal 1322, or at least portions thereof, is formed of metal or another electrically conducting material. In the exemplified embodiment, the pedestal 1322 is a metal screw, the first portion 1323 of the pedestal 1322 being the threaded portion of the metal screw and the second portion 1324 of the pedestal 1322 being the head portion of the metal screw.

In the exemplified embodiment, the light source 1321 (which forms a part of the second circuit assembly 1320) protrudes from the top edge 1302 of the body 1301. More specifically, the top edge 1302 of the body 1301 is spaced a first distance D1 from the first surface 1311 of the first circuit assembly 1310 that forms the floor of the electronic assembly 1300. The light source 1321 is spaced a second distance D2 from the first surface 1311 of the first circuit assembly 1310 that forms the floor of the electronic assembly 1300. The second distance D2 is greater than the first distance D1 such that the light source 1321 is suspended above the floor of the electronic assembly 1300 and extends beyond the top edge 1302 of the body 1301. This enables the light source 1321 to be positioned closer to the refracting portion of the lens member 1400 (specifically the conical reflective cavity 1401 of the lens member 1400) in the fully assembled device 1000, as described in more detail below.

Referring to FIGS. 46 and 48-50, and more specifically to FIGS. 49 and 50, concurrently, the operation of the device 1000 will be described. As noted above, the top portion 1109 of the housing 1100 comprises a first connection feature 1106 (i.e., external threads) that matingly engages and interacts with the second connection feature 1405 (i.e., internal threads) on the lens member 1400. Stated in simple terms, the lens member 1400 can be screwed onto the top portion 1109 of the housing 1100 via mating interaction between the first connection feature 1106 of the housing 1100 and the second connection feature 1405 of the lens member 1400. As noted above, although threads are the exemplified embodiment, other features or structures can be used for the first and second connection features 1106, 1405 in other embodiments.

The lens member 1400 can be screwed onto the housing 1100 in several different positions depending on how much of the threads of each respective component are engaged with one another. As one specific example, FIG. 49 illustrates the lens member 1400 coupled to the housing 1100 in a first position and FIG. 50 illustrates the lens member 1400 coupled to the housing 1100 in a second different position. Thus, the coupling between the lens member 1400 and the housing 1100 is alterable between at least: (1) a first sealed (or attached) state (FIG. 49) in which the lens member 1400 is coupled to the housing 1100 in a watertight manner and the light source 1321 is not emitting light; and (2) a second sealed (or attached) state (FIG. 50) in which the lens member 1400 is coupled to the housing 1100 in a watertight manner and the light source 1321 is emitting light. Of course, the lens member 1400 may also be in a detached stated whereby the lens member 1400 is completed detached and separated from the housing 1100. In both of the first and second sealed states, the second electrical contact 1330 of the electronic assembly 1300 is operably (or electrically) coupled to the power source 1200. In FIGS. 49 and 50 this is achieved via direct contact between the second electrical contact 1330 of the electronic assembly 1300 and one of the batteries 1201), although direct contact is not required for electrical coupling in all embodiments.

In each of the first and second sealed states, the lens member 1400 and the housing 1100 form a fluid or watertight seal such that fluids cannot penetrate into the internal cavity 1105 of the housing 1100. This is achieved due to the tight screw fit between the lens member 1400 and the housing 1100 and also due to the inclusion of the gaskets 1119a, 1119b described above. Thus, even when the lens member 1400 is not fully screwed onto the housing 1100 (i.e., the first sealed state illustrated in FIGS. 46 and 49), the lens member 1400 and the housing 1100 form a fluid-tight seal.

When the lens member 1400 is in the first sealed state, the power source 1200 is electrically coupled to the first electrical contact 1120 at the bottom of the cavity 1105 and to the second electrical contact 1330 of the electronic assembly 1300 (see FIGS. 46 and 49). However, in the first sealed state the third electrical contact 1340 of the electronic assembly 1300 is not electrically coupled to the first electrical contact 1120. Rather, in the first sealed state the third electrical contact 1340 of the electrical assembly 1300 is physically spaced apart from the first electrical contact 1120. Thus, in this state the "switch" formed by the first and third electrical contacts 1120, 1340 is open such that there is no closed electrical circuit loop and power can not be transmitted from the power source 1200 to the light source 1321. That is why the light source 1321 is not activated (i.e., is powered off and not emitting light) in FIGS. 46 and 49.

Continued screwing of the lens member 1400 onto the housing 1100 will bring the lens member 1400 into the second sealed state depicted in FIGS. 48 and 50. Specifically, as a user continues to screw the lens member 1400 onto the housing 1100 (or otherwise couple the lens member 1400 to the housing 1100 as techniques other than threaded connectors may be use including a simple press fit with multiple sealed states or the like), the lens member 1400 forces the electronic assembly 1300 to move axially downward further into the internal cavity 1105 of the housing 1100. This occurs due to interaction between an interior surface 1419 of the lens member 1400 and the top edge 1302 of the body 1301 of the electronic assembly 1300. In the exemplified embodiment, the electronic assembly 1300 moves axially downward into the internal cavity 1105 until the third electrical contact 1340 comes into direct contact with the first electrical contact 1120. This contact (and corresponding electronic coupling) between the third electrical contact 1340 of the electronic assembly 1300 and the first electrical contact 1120 closes the "switch" and the electrical circuit loop such that power is transmitted from the power source 1200 to the light source 1321. Thus, in the exemplified embodiment when the lens member 1400 is coupled to the housing 1100 in the second attached state, the light source 1321 is automatically activated to emit light as shown in FIGS. 48 and 50. In other embodiments, activation of the light source 1321 may require both closing the switch as described above and actuating an actuator (such as a button on the housing or the like) to activate the light source 1321.

In the first attached state, an uppermost end 1402 of the lens member 1400 protrudes a first distance D3 from the top end 1102 of the housing 1100 and in the second attached state the uppermost end 1402 of the lens member 1400 protrudes a second distance D4 from the top end 1102 of the housing 1100. The first distance D3 is greater than the second distance D4.

When the lens member 1400 is in the second attached state and the light source 1321 is activated, the light source 1321 is positioned in a specific location relative to the lens member 140. In that regard, the interior surface 1419 of the lens member 1400 comprises a roof portion 1420 having a recess 1421 formed therein. Within the floor of the recess 1421 is a protrusion 1422 (or alternatively the floor of the recess 1421 has a convex outer surface that faces the light source 1321). The light source 1321 is positioned so as to be adjacent to and very closely spaced (approximately 1-3 mm) from an end of the protrusion 1422 (or the floor of the recess 1421). This close spacing between the light source 1321 and the protrusion 1422 facilitates and assists in the dispersion of the light emitted from the light source 1321 by the lens member 1400 as described in more detail above with reference to FIGS. 6 and 7.

The visual distress signal devices 10A, 10B and 10C, 1000 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a visual distress signal device or emergency beacon in accordance with the spirit of this disclosure, and such changes, alternations and modifications as would occur to those skilled in the art are considered to be within the scope of this design as broadly defined in the appended claims.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

Further, the purpose of the foregoing abstract is to enable the U.S. Patent and Trademark Office and the public generally, and especially the scientists, engineers, practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A visual distress signal device comprising:
   a housing having a closed bottom end, an open top end, and an internal cavity, a first electrical contact positioned within the internal cavity;
   a power source positioned within the internal cavity of the housing, the power source electrically coupled to the first electrical contact;
   an electronic assembly at least partially positioned within the internal cavity of the housing, the electronic assembly comprising a second electrical contact that is electrically coupled to the power source, a third electrical contact that is electrically isolated from the second electrical contact, and a light source;
   a lens member detachably coupled to the housing to close the open top end of the housing in a watertight manner to prevent liquids from passing into the internal cavity of the housing; and
   a float member detachably coupled to the housing, wherein the visual distress signal device floats when placed in water with the float member attached to the housing; and
   wherein the coupling between the lens member and the housing is alterable between: (1) a first sealed state in which the lens member is coupled to the housing in a watertight manner and the light source is not activated and does not emit light; and (2) a second sealed state in which the lens member is coupled to the housing in a watertight manner and the light source is activated and emits light, wherein altering the coupling between the lens member and the housing from the first sealed state to the second sealed state automatically activates the light source.

2. The visual distress signal device of claim 1 wherein a top portion of the housing comprises a first connection feature and the lens member comprises a second connection feature that mates with the first connection feature to couple the lens member to the housing.

3. The visual distress signal device of claim 1 wherein the power source is electrically coupled to the first electrical contact via a spring, wherein in the first sealed state the third electrical contact of the electronic assembly is not electrically coupled to the first electrical contact and in the second sealed state the third electrical contact of the electronic assembly is electrically coupled to the first electrical contact, thereby activating the light source to emit light, and wherein transitioning from the first sealed state to the second sealed state comprises applying a downward pressure onto the power source to compress the spring, thereby moving the power source downwardly within the internal cavity of the housing.

4. The visual distress signal device of claim 1 wherein coupling the lens member to the housing comprises engaging mating threads on the housing and the lens member, wherein in the first sealed state the threads on the housing and the lens member are matingly engaged and the third electrical contact is spaced apart from the first electrical contact, and wherein in the second sealed state the threads on the housing and the lens member are matingly engaged and the third electrical contact is in contact with the first electrical contact.

5. The visual distress signal device of claim 1 wherein the electronic assembly comprises a body having a top edge surrounding an open top end and a bottom edge surrounding an open bottom end, a first circuit assembly coupled to the bottom edge of the body and forming a floor of the electronic assembly, and a second circuit assembly that is spaced above the floor of the electronic assembly, the second circuit assembly comprising the light source.

6. The visual distress signal device of claim 5 wherein the top edge of the body is spaced a first distance from the floor of the electronic assembly and the light source is spaced a second distance from the floor of the electronic assembly, the second distance being greater than the first distance such that the light source is suspended above the floor of the electronic assembly and extends beyond the top edge of the body.

7. The visual distress signal device of claim 5 wherein the second circuit assembly is positioned atop a pedestal to suspend the second circuit assembly within cavity of the electronic assembly defined by the second circuit assembly and an inner surface of the body.

8. The visual distress signal device of claim 7 wherein the first circuit assembly comprises a first surface that forms the floor of the electronic assembly and a second surface that forms a bottom surface of the electronic assembly, and wherein the pedestal comprises a first portion protruding from the first surface of the first circuit assembly that supports the second circuit assembly and a second portion protruding from the second surface of the first circuit assembly, the second portion of the pedestal forming the second electrical contact of the electronic assembly.

9. The visual distress signal device of claim 5 wherein the first circuit assembly comprises a microcontroller that controls a pattern of light emitted by the light source when the light source is activated.

10. The visual distress signal device of claim 1 wherein the float member is formed of a compressible foam material.

11. The visual distress signal device of claim 1 wherein the housing extends along a longitudinal axis from the closed bottom end to the open top end, and wherein the lens member comprises an outer surface comprising a conical reflective cavity, and wherein the lens member is configured to refract tight emitted by the light source in at least two separate patterns including a 360 degree horizontal pattern in a direction transverse to the longitudinal axis of the housing and a vertical pattern in a direction of the longitudinal axis of the housing.

12. The visual distress signal device of claim 1 wherein the light source consists of a single light emitting diode.

13. A visual distress signal device comprising:
a housing defining an internal cavity;
an electronic assembly at least partially positioned within the internal cavity of the housing, the electronic assembly comprising an illumination device;
a power source positioned within the internal cavity of the housing and configured to power the illumination device;
a first electrical contact secured within the internal cavity of the housing and operably coupled to the power source;
the electronic assembly comprising a second electrical contact that is operably coupled to the power source and a third electrical contact that is electrically isolated from the second electrical contact; and
a lens member detachably coupled to the housing between: (1) a first attached state in which the lens member is coupled to the housing in a watertight manner, the third electrical contact is spaced from and not operably coupled to the first electrical contact, and the illumination device is not activated and does not emit light; (2) a second attached state in which the lens member is coupled to the housing in a watertight manner, the third electrical contact is in contact with and operably coupled to the first electrical contact, and the illumination device is activated and emits light; and (3) a detached state in which the lens member is completely detached and separated from the housing; and
wherein altering the coupling of the lens member to the housing from the first attached state to the second attached state automatically activates the illumination device.

14. The visual distress signal device of claim 13 wherein the housing extends from a bottom end to a top end, and wherein in the first attached state an uppermost end of the tens member protrudes a first distance from the top end of the housing and in the second attached state the uppermost end of the lens member protrudes a second distance from the top end of the housing, the first distance being greater than the second distance.

15. A visual distress signal device comprising:
a housing having an internal cavity;
a light source located within said internal cavity;
a power source located within said internal cavity;
an optical lens located above said light source, said optical lens terminating in an uppermost end that defines an opening into a conical reflective cavity, the conical reflective cavity being exposed on an outer surface of said optical lens and extending from the uppermost end to a floor of the conical reflective cavity and having a diameter that decreases with distance from the uppermost end of the optical lens to the floor;
wherein the optical lens comprises an internal cavity having a roof, wherein the internal cavity of the optical lens is isolated from the conical reflective cavity, and wherein the roof comprises a concave portion having a convex protuberance extending therefrom, the convex protuberance being aligned with an apex of the conical reflective cavity; and
wherein said optical lens is configured to refract and simultaneously transmit at least two separate beam light patterns from the light source including a horizontal 360 degree light pattern and a vertical light pattern.

16. The visual distress signal of claim 15 wherein said light source consists of a single light emitting diode.

* * * * *